(12) United States Patent
Reilly

(10) Patent No.: US 9,546,032 B2
(45) Date of Patent: Jan. 17, 2017

(54) VAC N' STACK (PRESERVATION AND STORAGE SAVING PRODUCT)

(71) Applicant: Karl Stephen Reilly, Ratoath (IE)

(72) Inventor: Karl Stephen Reilly, Ratoath (IE)

(73) Assignee: Karl Stephen Reilly (IE)

( * ) Notice: Subject to any disclaimer, the term of this patent is extended or adjusted under 35 U.S.C. 154(b) by 0 days.

(21) Appl. No.: 14/262,764

(22) Filed: Apr. 27, 2014

(65) Prior Publication Data

US 2015/0307254 A1    Oct. 29, 2015

(51) Int. Cl.
  *B65D 51/16*    (2006.01)
  *B65D 81/20*    (2006.01)
  *B65D 21/02*    (2006.01)

(52) U.S. Cl.
  CPC ....... *B65D 81/2038* (2013.01); *B65D 21/0219* (2013.01); *B65D 51/1683* (2013.01)

(58) Field of Classification Search
  CPC . B65D 81/2038; B65D 81/2007; B65D 81/20; B65D 21/0217; B65D 51/16
  USPC ......... 206/508; 220/380, 367.1, 203.29, 361, 220/796, 287, 203.04, 231
  See application file for complete search history.

(56) References Cited

U.S. PATENT DOCUMENTS

| | | | | |
|---|---|---|---|---|
| 3,559,843 A | * | 2/1971 | Kern ................... | B65D 43/021 220/266 |
| 2004/0206765 A1 | * | 10/2004 | McMahon, III ... | B65D 43/0222 220/780 |
| 2006/0032852 A1 | * | 2/2006 | Cai .................... | B65D 51/1683 220/287 |
| 2007/0228051 A1 | * | 10/2007 | Meroni .............. | B65D 43/0218 220/580 |
| 2008/0073366 A1 | * | 3/2008 | Backaert ............. | B65D 79/005 220/785 |
| 2010/0102058 A1 | * | 4/2010 | Turvey ............... | B65D 81/2038 220/203.29 |

* cited by examiner

*Primary Examiner* — King M Chu

(57) ABSTRACT

This product is a storage container with a depressible cover that can create an internal vacuum. In doing so it can reduce it's volume, allowing another similar container to be stored inside the initial container without removing its cover. Through these features, this product's primary aims are to preserve food for longer in a vacuum, thereby reducing waste and drastically reducing the amount of space being used for storage (whether it's food in the refrigerator or clothes in the wardrobe).

This product is also available as an airtight cover that can be attached to cans, jars or similar products to provide the ability to simply reseal canned or jarred foods in a vacuum (partial or 100% vacuum) as well as the ability to stack these cans or jars into each other to save storage space. Such airtight covers can also be applied to dishware.

While this product has many different designs for different areas, it should be stressed that the functionality of each design remains identical for the purposes of this patent. Therefore this utility patent relates to a covered storage product that can reduce its internal volume by depression of its cover, which is held in place by a vacuum and can be internally stacked according to the definition of internally stacked above.

1 Claim, 30 Drawing Sheets

Figs 1.1 VIEWS
General Food & General Storage
Fig. 1.1.1 Elevation
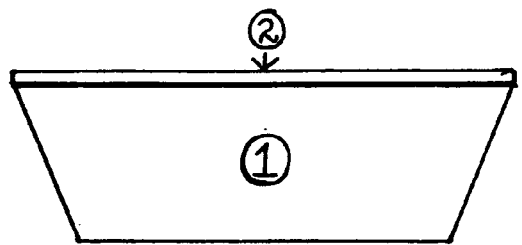
Fig 1.1.2 End-View
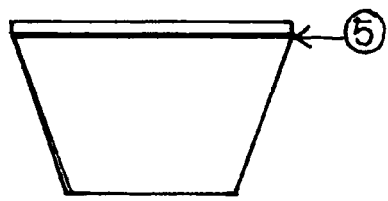
Fig. 1.1.3 Plan
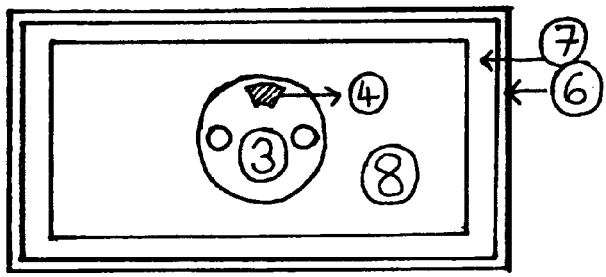

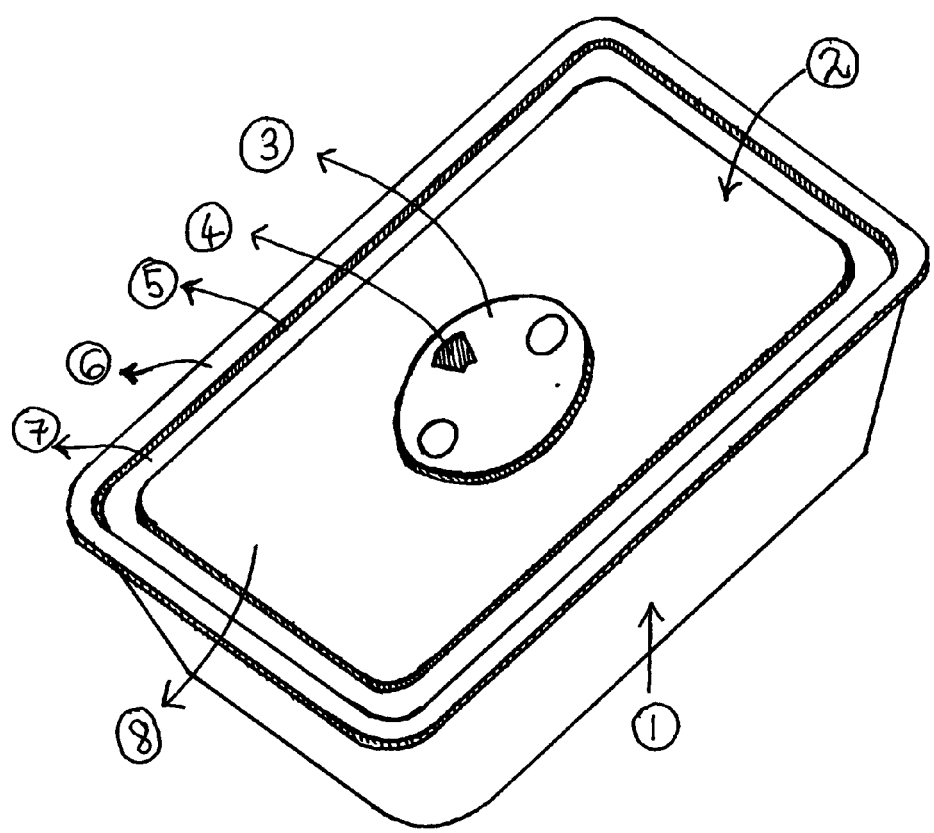

Figs. 1.3 - COMPONENTS
General Food & General Storage
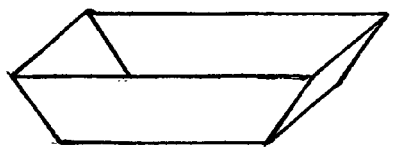
① Storage Container
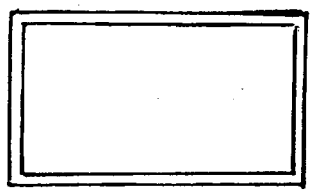
② Outer Perimeter (cover)
③ Gasket
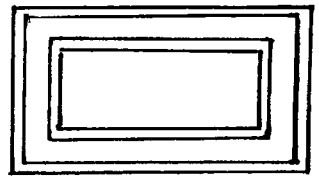
④ Stretchable Band
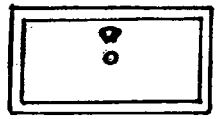
⑤ Push n' Vac Center Part
⑥ Twist n' Vac Circle

Figs. 1.4 Process-Pack, Vac, Stack
General Food and General Storage
Fig. 1.4.1 Pack
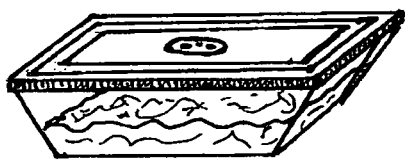
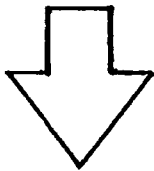
Fig. 1.4.2 Vac
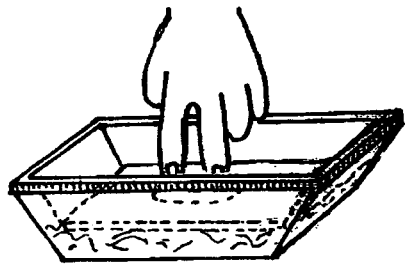
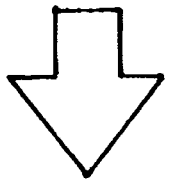
Fig. 1.4.3 Stack
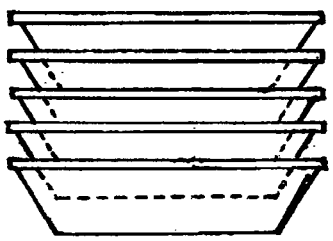

Figs. 1.5 Problem vs. Solution
General Food and General Storage
Fig 1.5.1 - Problem
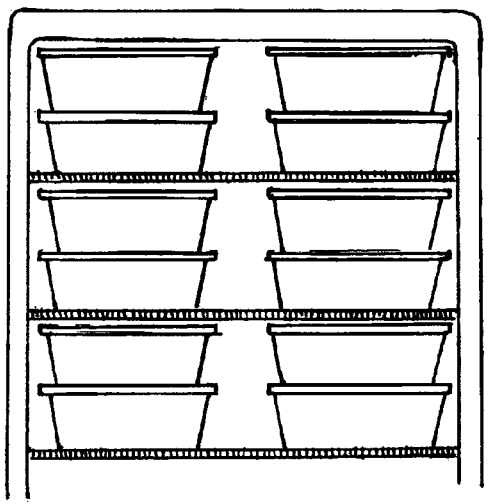
Fig. 1.5.2 - Solution
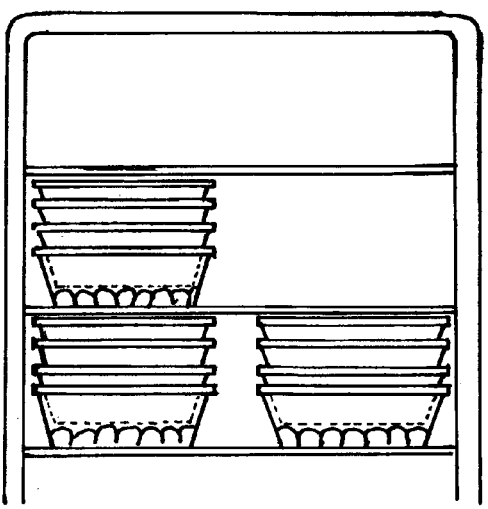

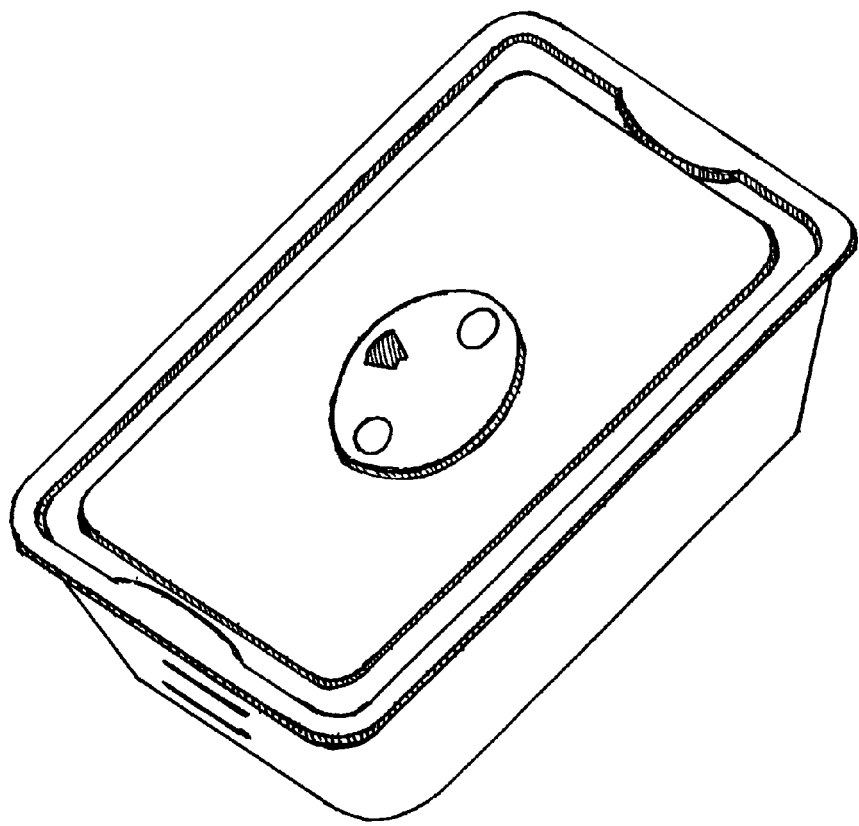
Fig. 1.6: Variations on the Design
General Food and General Storage

Figs. 2.1 VIEWS
Liquid Food Storage
Fig. 2.1.1 Elevation
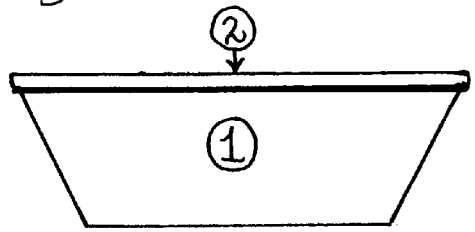
Fig. 2.1.2 End-View
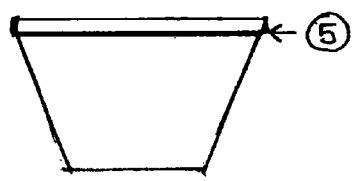
Fig. 2.1.3 Plan
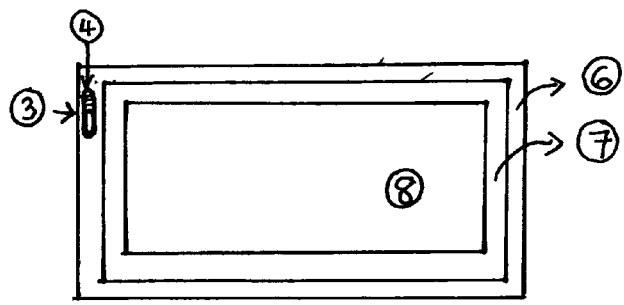

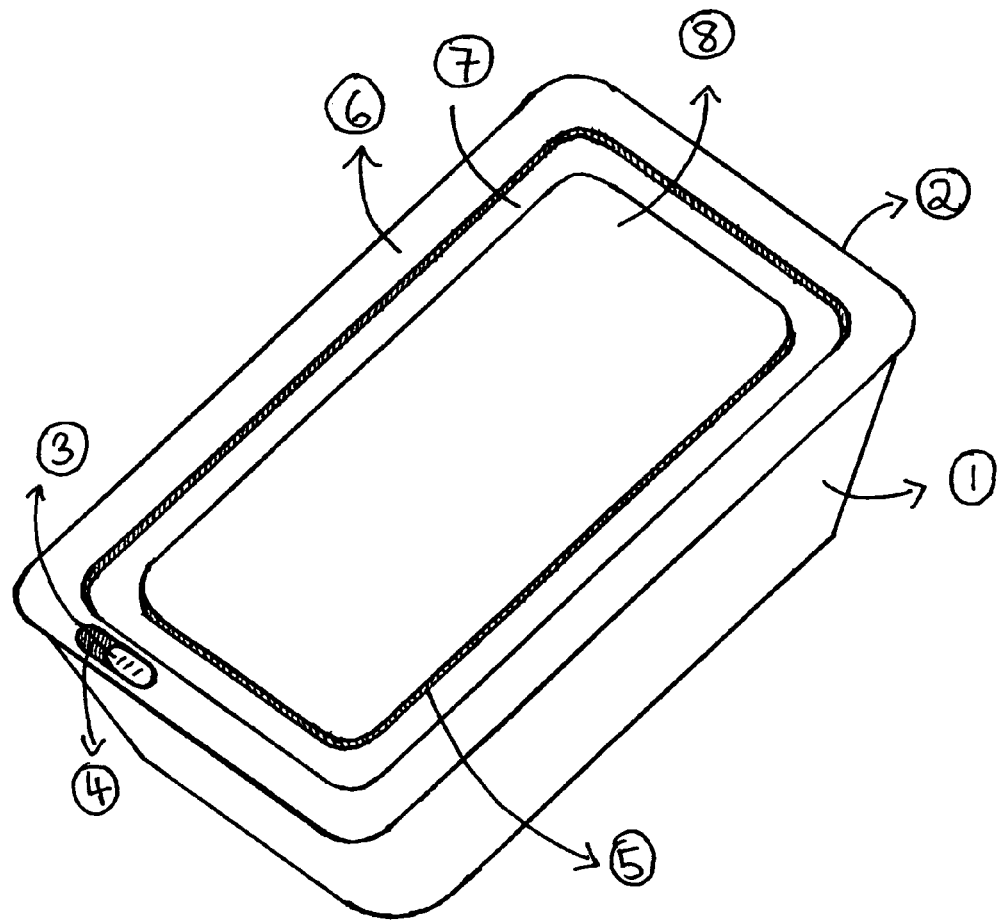
Fig. 2.2 Perspective
Liquid Food Storage

Figs. 2.3 COMPONENTS
Liquid Food Storage
① Storage Container
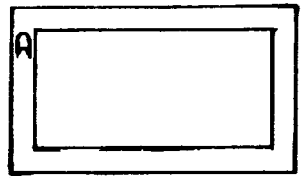
② Outer Perimeter (cover)
③ Slide n' Vac Switch
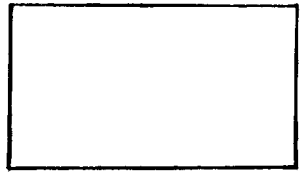
④ Gasket
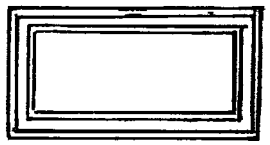
⑤ Stretchable Band
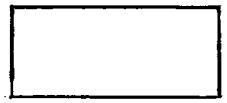
⑥ Push n' Vac Center-Part

Figs. 2.4 Process - Pack, Vac, Stack
Liquid Food Storage
Fig. 2.4.1 : Pack
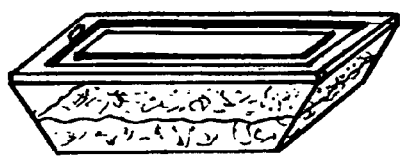
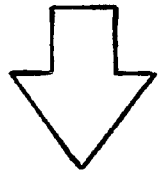
Fig. 2.4.2 Vac
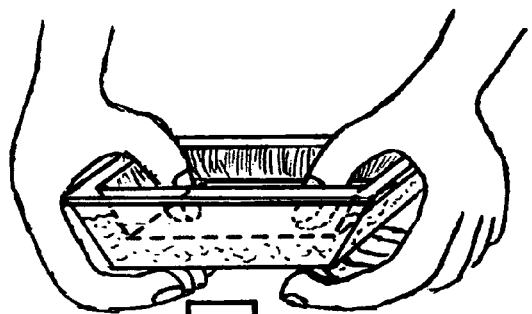
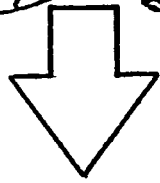
Fig. 2.4.3 Stack
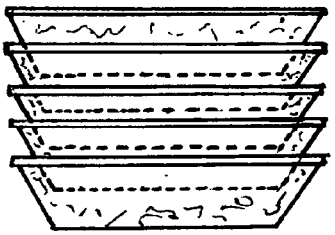

Figs. 2.5 Problem vs. Solution
Liquid Food Storage
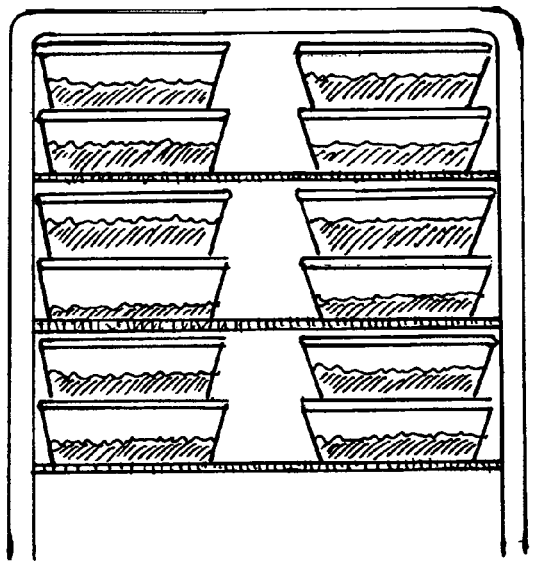
Fig. 2.5.1 - Problem
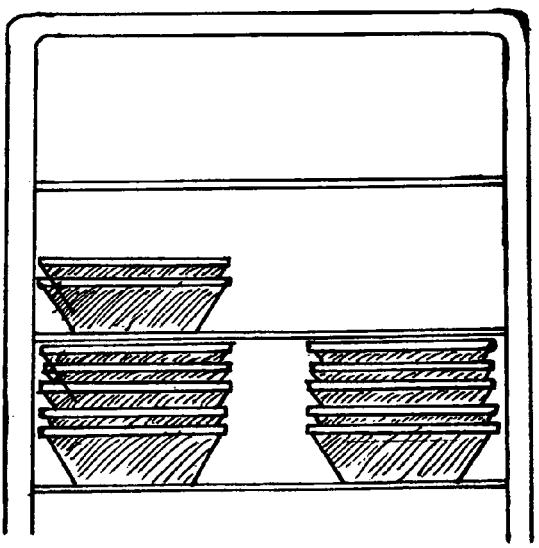
Fig. 2.5.2 - Solution

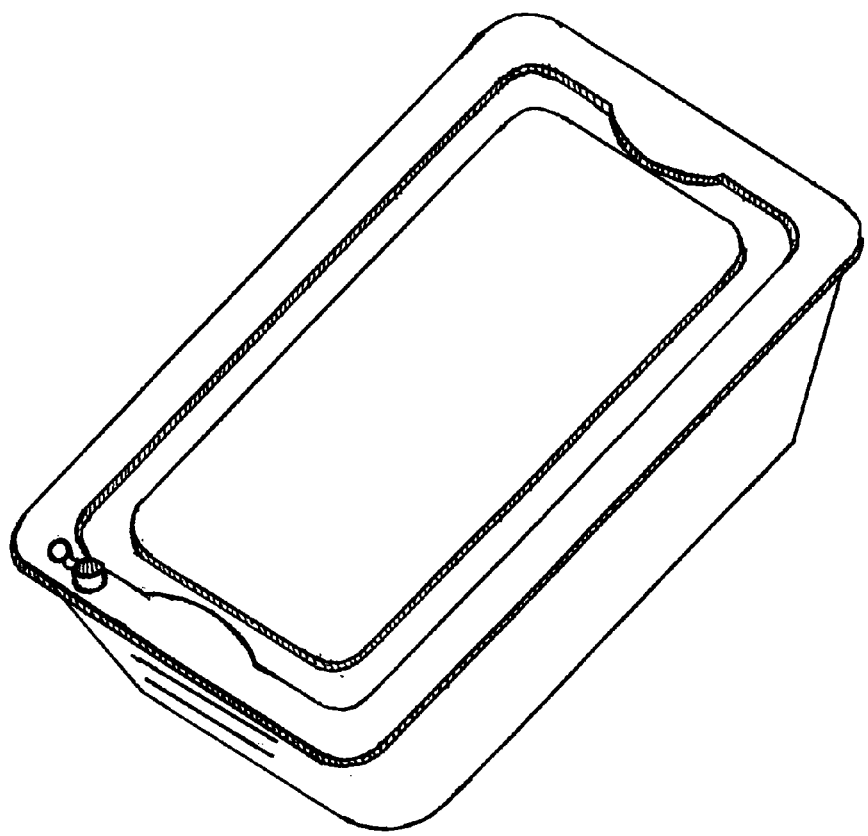
Fig. 2.6: Variations on the Design
*Liquid Food Storage*

Figs. 3.1 VIEWS
Cereal Storage
Fig. 3.1.1 Elevation
Fig. 3.1.2 End-View
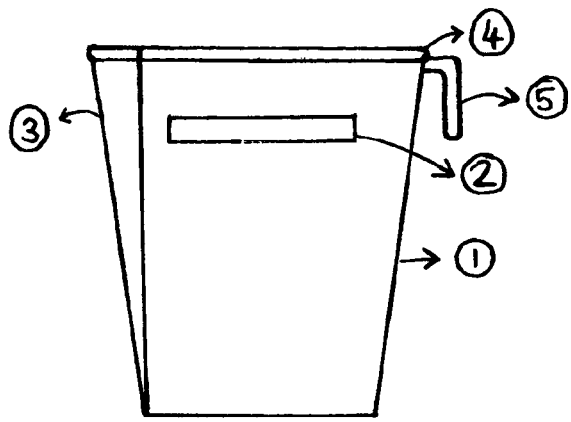
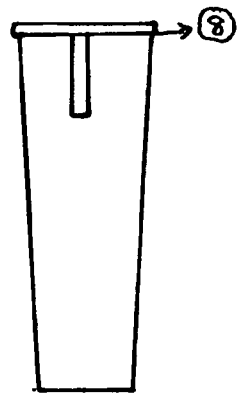
Fig. 3.1.3 Plan
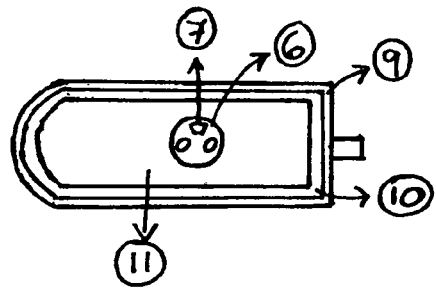

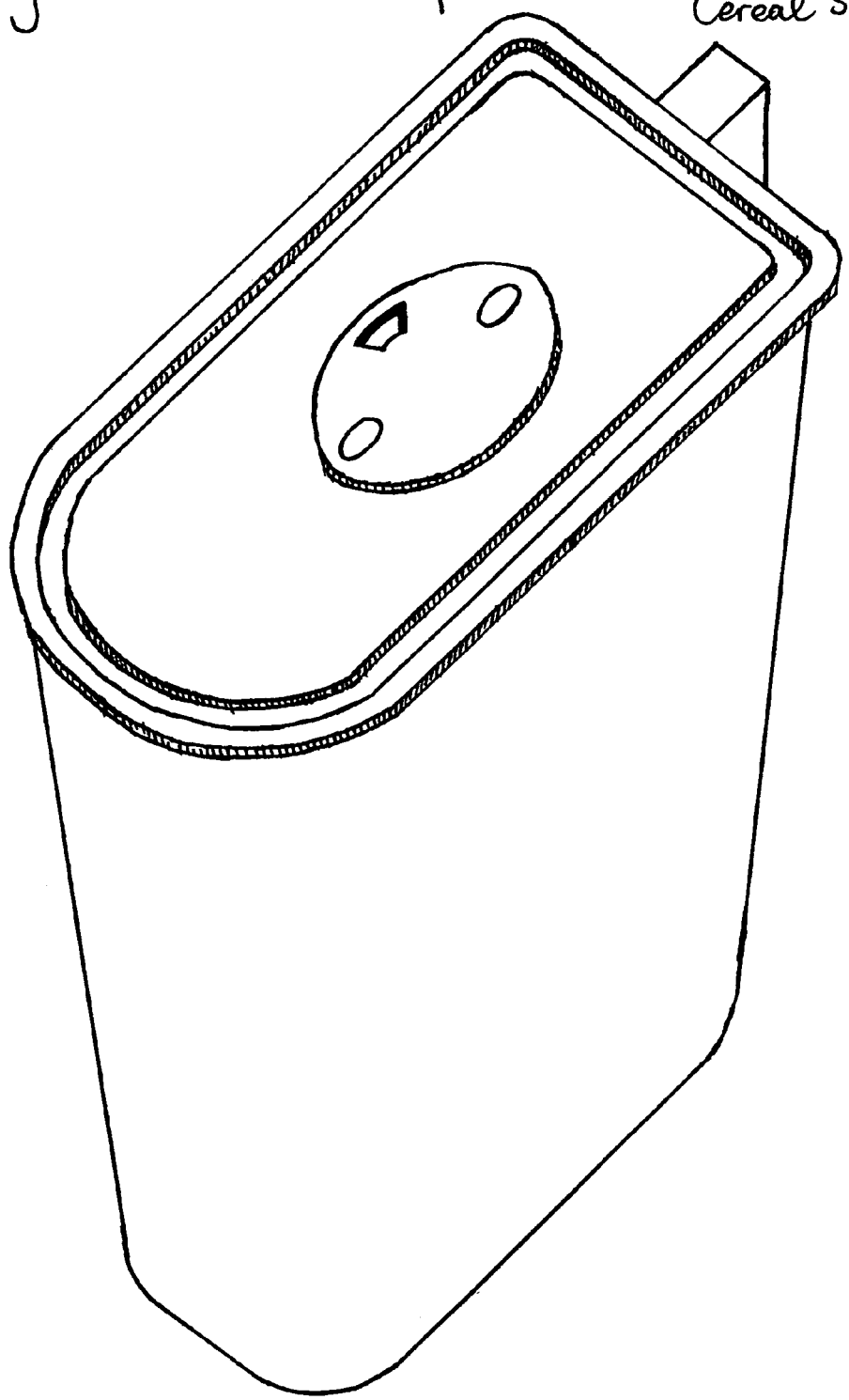
Fig. 3.2 - Perspective    Cereal Storage

Figs. 3.3 COMPONENTS
Cereal Food Storage
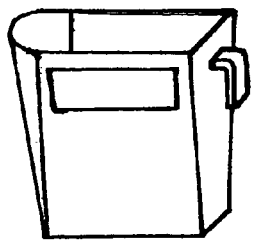
① Storage Container
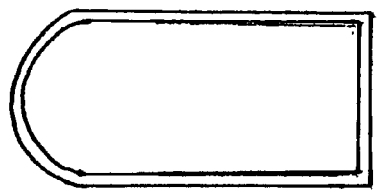
② Outer Perimeter (cover)
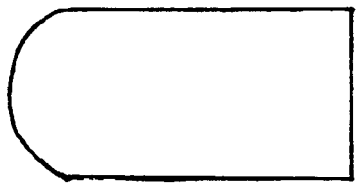
③ Gasket
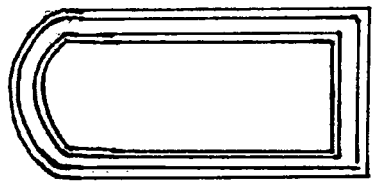
④ Stretchable Band
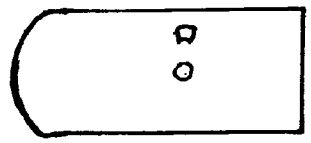
⑤ Push n' Vac Center-Part
⑥ Twist n' Vac Circle

Figs. 3.4 ~ Process - Pack, Vac, Stack
Cereal Storage
Fig. 3.4.1 Pack
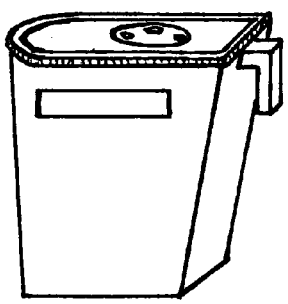
Fig. 3.4.2 Vac
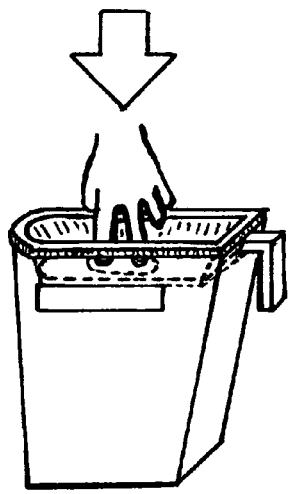
Fig. 3.4.3 Stack
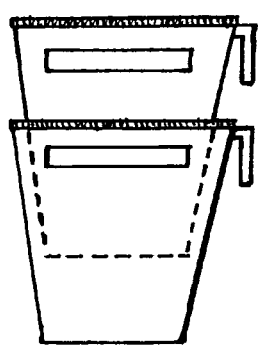

Figs. 3.5 - Problem vs. Solution
Cereal Storage
Fig 3.5.1 - Problem
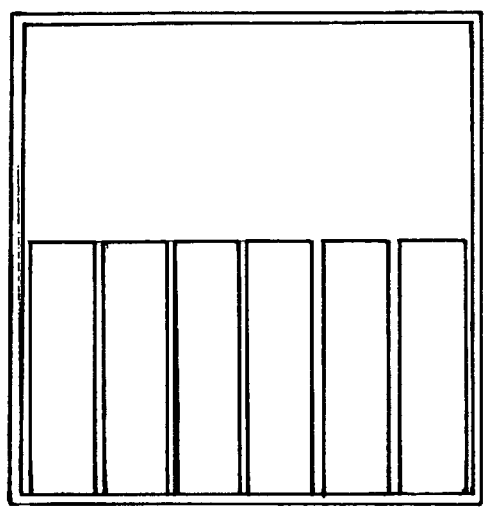
Fig 3.5.2 - Solution
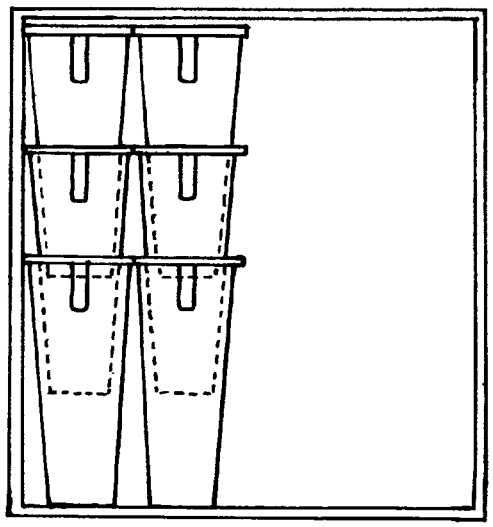

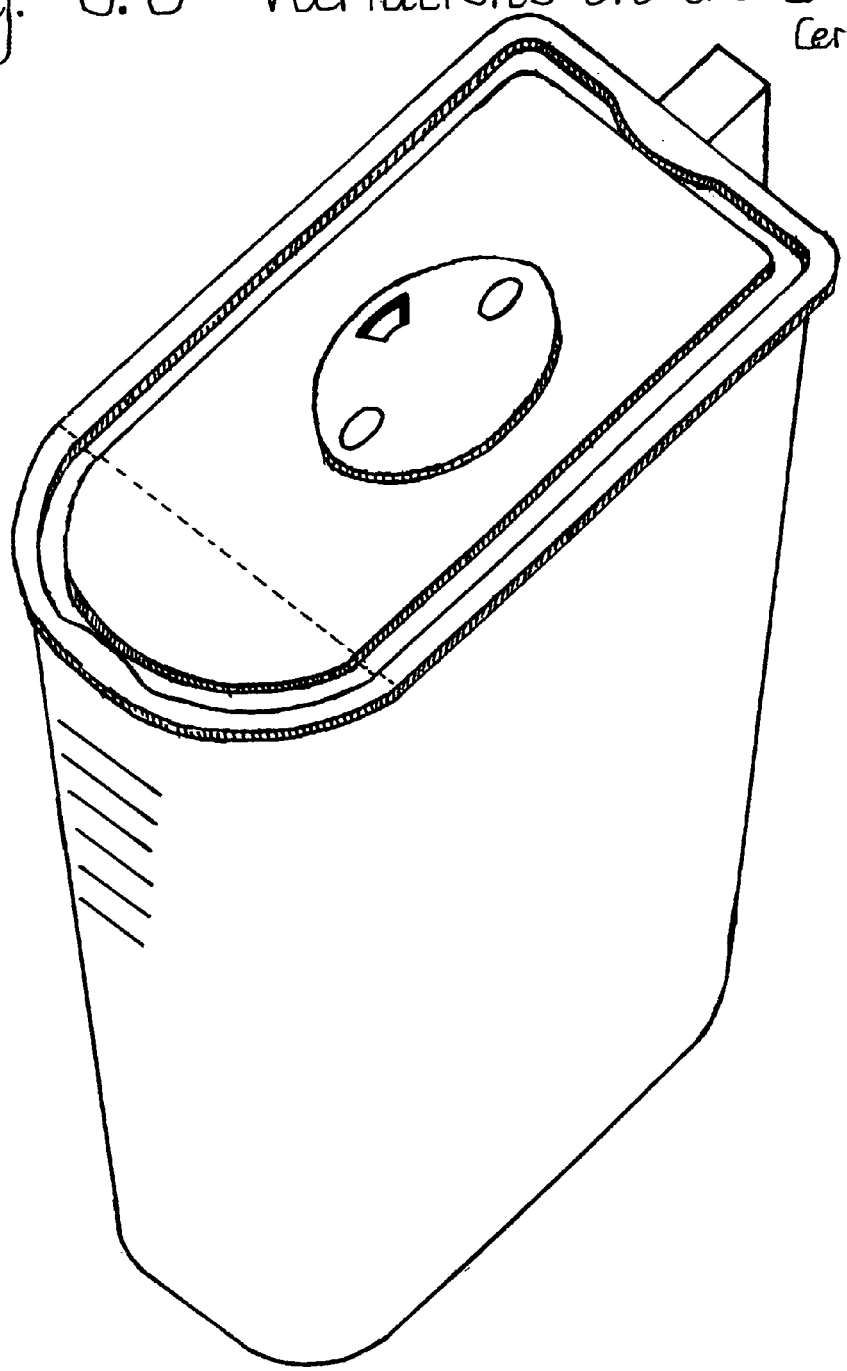
Fig. 3.6: Variations on the Design
Cereal Storage

Figs. 4.1 VIEWS
Beverage Storage
Fig. 4.1.1 Elevation
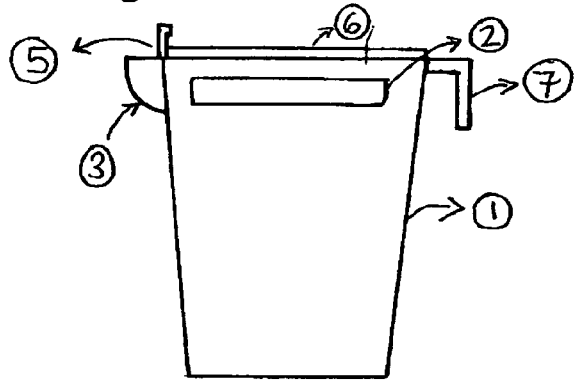
Fig. 4.1.2 End View
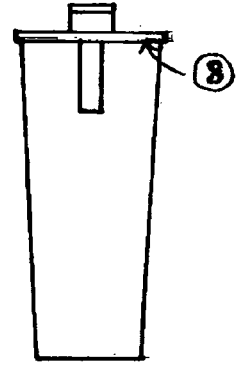
Fig. 4.1.3 Plan
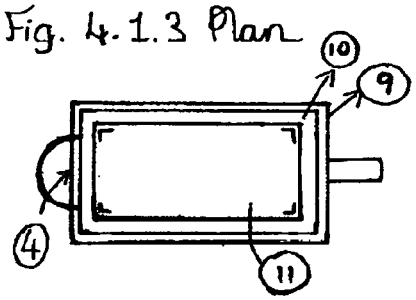

Fig. 4.2 - Perspective    Cereal Storage
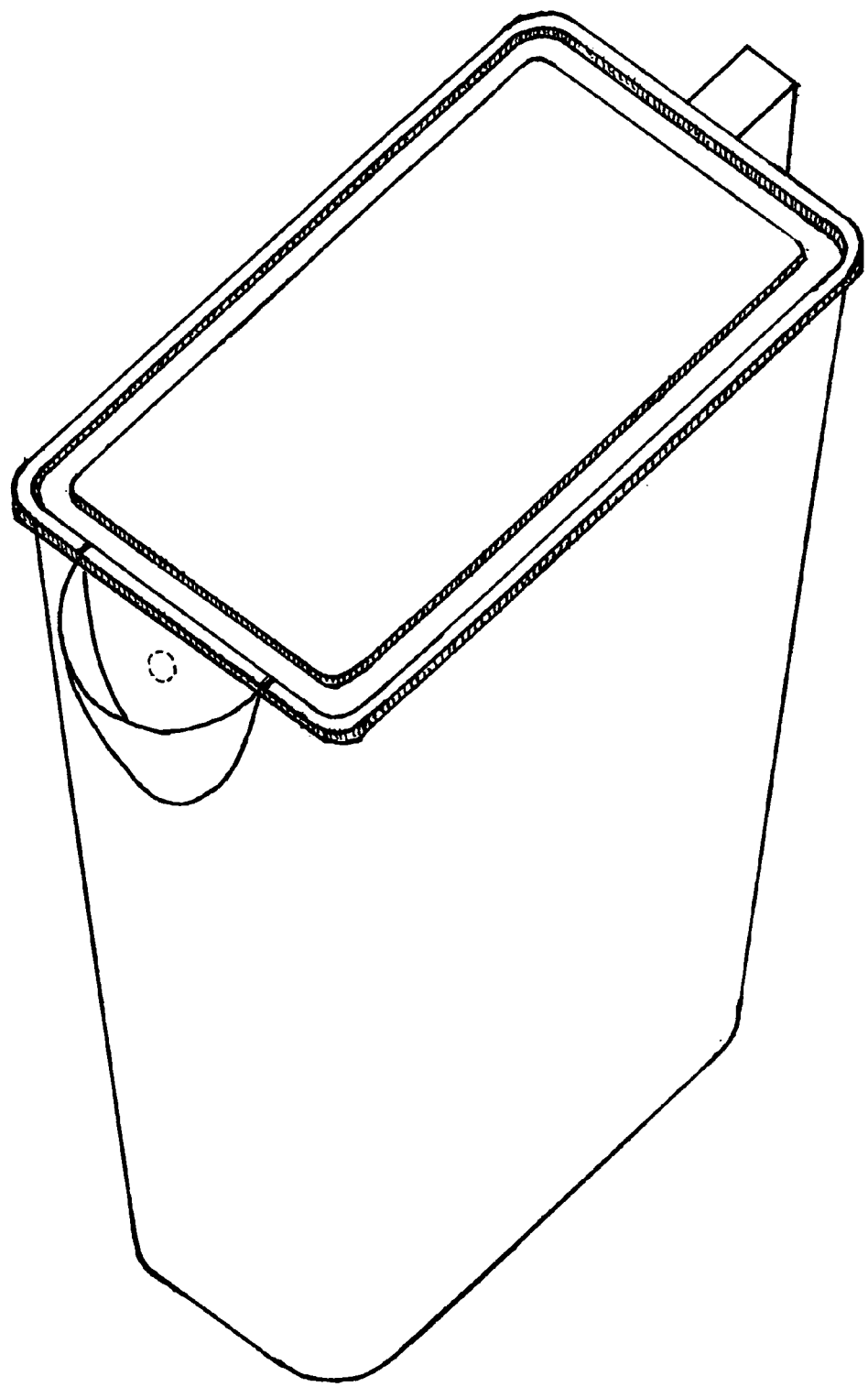

Figs. 4.3 COMPONENTS
Beverage Storage
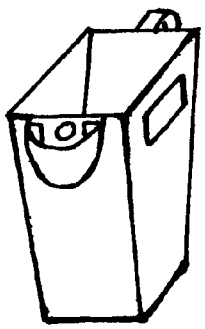
① Storage Container
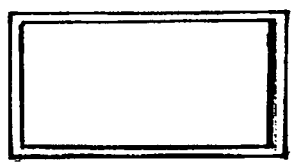
② Outer Perimeter (cover)
③ Shut n' Vac Slide
④ Gasket
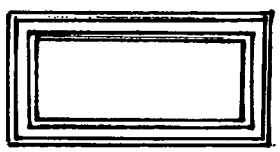
⑤ Stretchable Band
⑥ Push n' Vac Center-Part

Figs. 4.4 Process-Pack, Vac, Stack
Beverage Storage
Fig. 4.4.1 - Pack
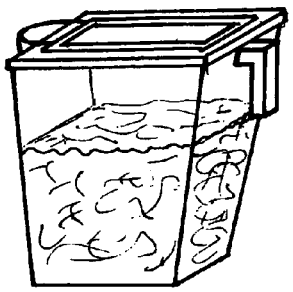
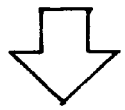
Fig. 4.4.2 - Vac.
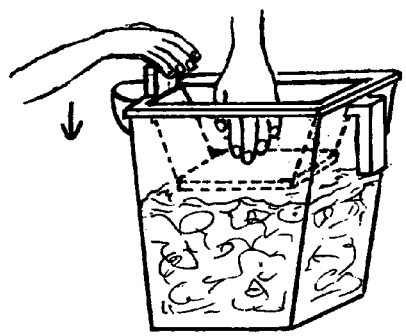
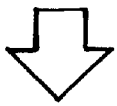
Fig. 4.4.3 - Stack
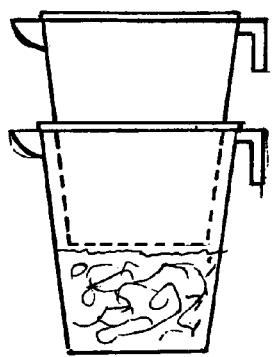

Figs. 4.5 - Problem vs. Solution
Beverage Storage
Fig. 4.5.1 - Problem
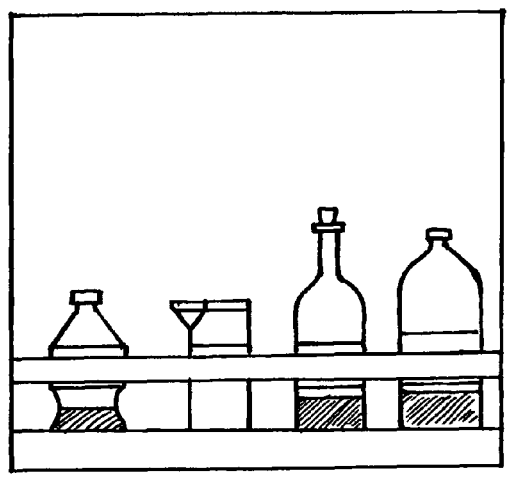
Fig. 4.5.2 - Solution
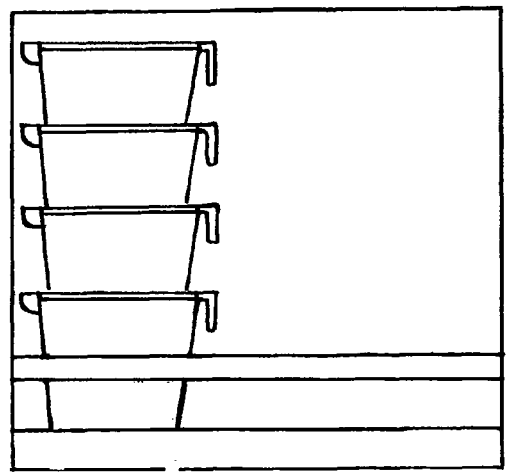

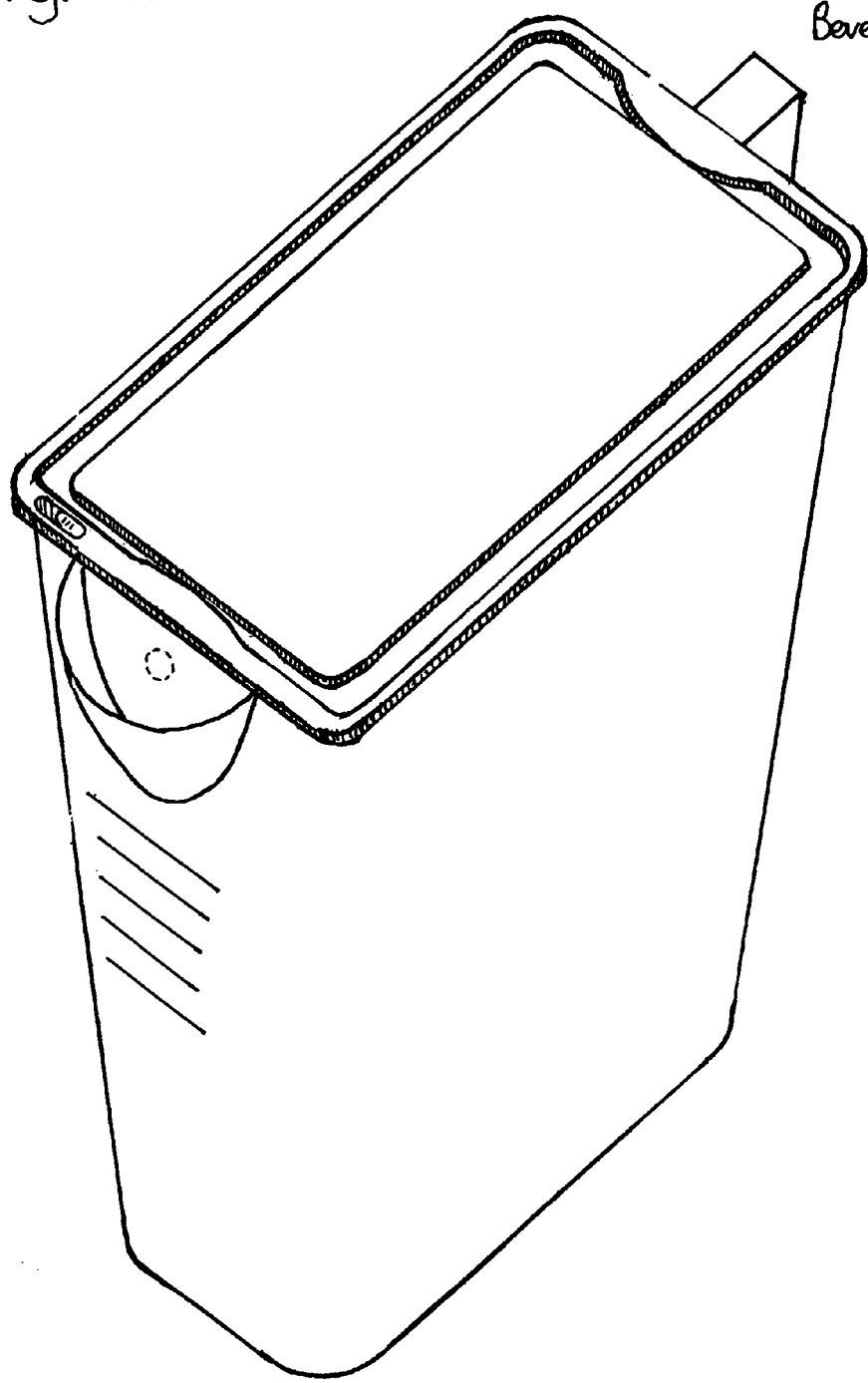
Fig. 4.6 Variations on the Design
Beverage Storage

Figs. 5.1 VIEWS
Canned and Jarred Food Storage
Fig. 5.1.1 Elevation    Fig. 5.1.2 End-View
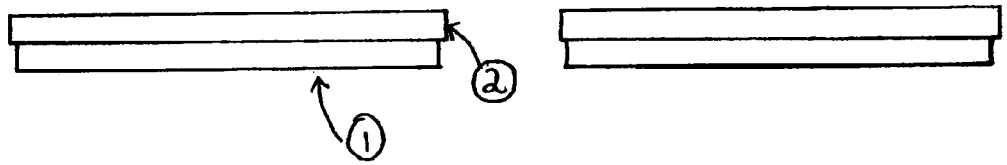
Fig. 5.1.3 Plan
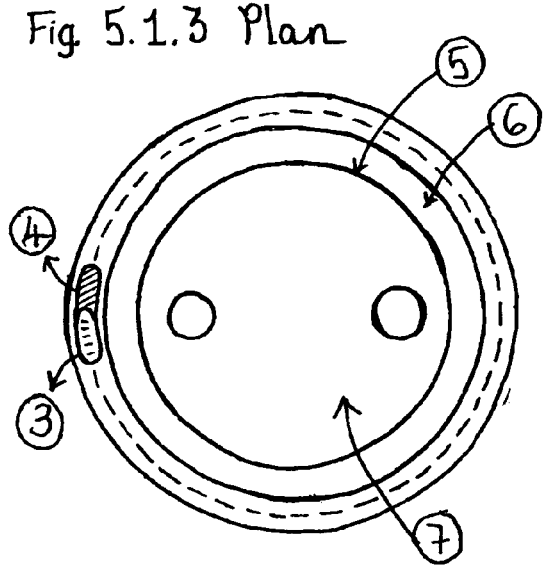

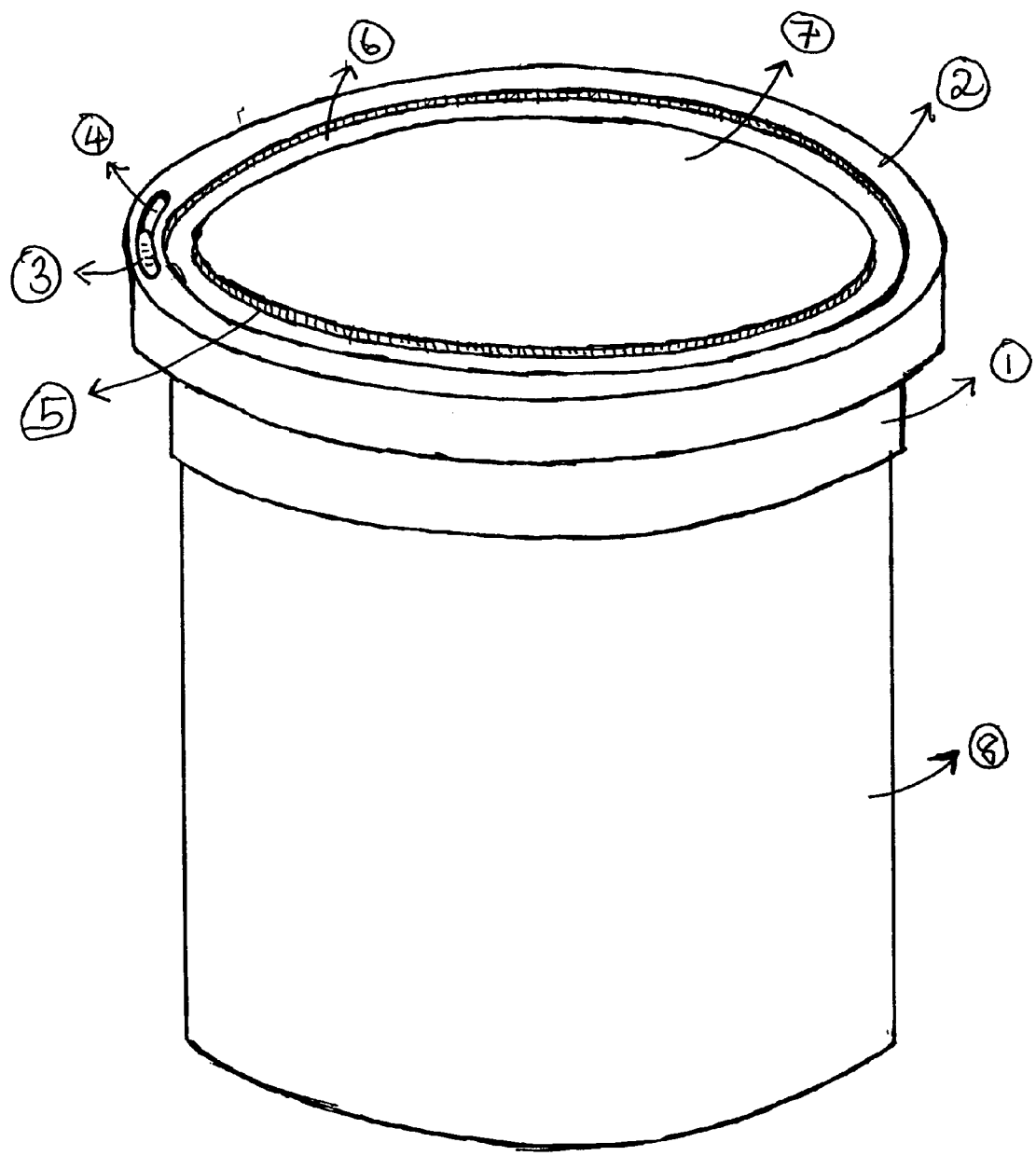

Figs. 5.3 COMPONENTS
Canned and Jarred Food Storage
① Underlying Stretchable Perimeter
② Outer Stretchable Perimeter
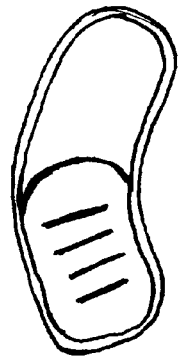
③ Slide n' Vac Switch & Vac-Hole
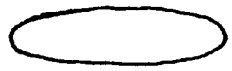
④ Gasket
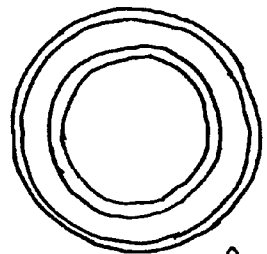
⑤ Stretchable Band
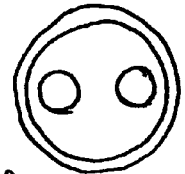
⑥ Push n' Vac Center-Part

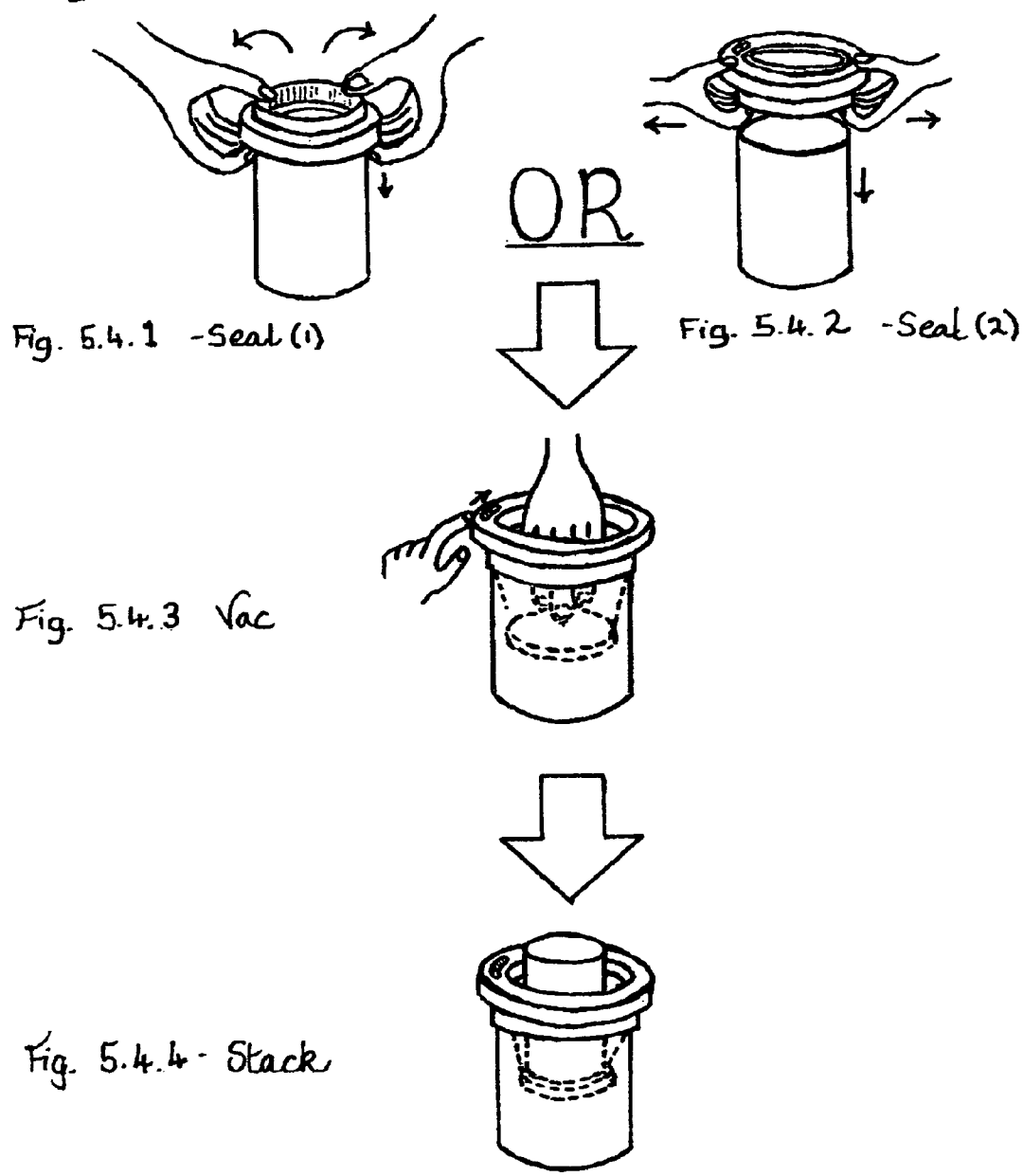

Figs. 5.5 - Problem vs. Solution
Canned and Jarred Food Storage
Fig. 5.5.1 - Problem
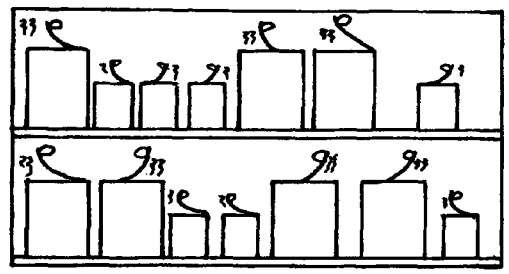
Fig. 5.5.2 - Solution
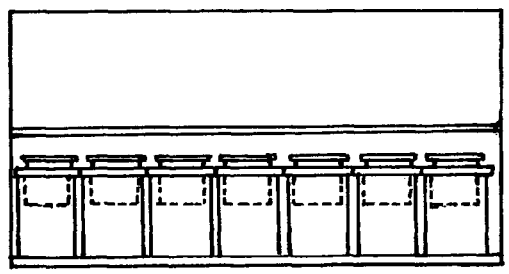

Figs. 5.6 - Variations on the Design
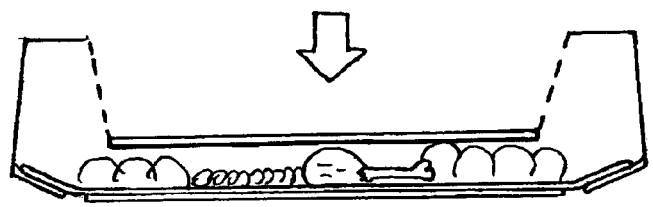
Fig. 5.6.1: Elevation of Plate Cover
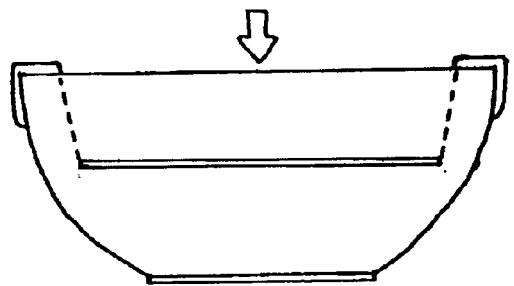
Fig. 5.6.2 Elevation of Dish Cover

VAC N' STACK (PRESERVATION AND STORAGE SAVING PRODUCT)

SECTION 1 BACKGROUND

[1.1] Introduction

This environmentally friendly product (invention) is in the fields of food and drink preservation, food and drink storage, general preservation and general storage. The product covers two fundamental functions [1.2] that will apply to two marketable products [1.3].

[1.2] Functions (2)

The primary functions* of this invention include, but are not limited to:

Creating a vacuum inside a storage container without an additional instrument (e.g. a pump) by depressing the Center-Part of the storage container's cover (or lid). As the Center-Part is depressed, the Stretchable Band, which connects the Center-Part to the Perimeter, also stretches downwards and air from inside the container is forced out through the Vac-Hole. When the inside of the Center-Part makes contact with the item stored within and no more air can be expelled, the Vac-Hole is then sealed, thus creating a vacuum inside the storage container. As a result of this vacuum the Center-Part of the cover will remain depressed.

Creating additional storage space by reducing the internal volume of the storage container(s) through the above action of creating a vacuum and then implementing the stackable feature, if necessary, with other similar containers.

*Functions are explained in more detail in Process of Using the Product segments in Section 4.

[1.3] Marketable Products (2)

The primary marketable products include, but are not limited to:

A range of different reusable storage containers (with depressible covers) of varying size and design that perform either one or both functions described in [1.2] and that are each customized to their specific market outlined in [1.4].

A range of reusable covers of varying size and design that perform either one or both functions described in [1.2] and that are customized to their specific market outlined in [1.4].

[1.4] Target Markets

This reusable storage container or reusable storage cover is targeted at, but not limited to, the following markets (with examples):

[1.4.1] Reusable Storage Container Markets:
  Solid food storage market (e.g. fruit, vegetables, meat, legumes etc.).
  Liquid food storage market (e.g. soups, sauces etc.).
  Cereals market (e.g. breakfast cereals, pasta, rice etc.).
  Beverage storage market (e.g. milk, soft drinks, wine, water etc.).
  General storage market (e.g. medical supplies, clothing, children's toys etc.).

[1.4.2] Reusable Storage Cover Markets:
  Canned food market (e.g. fish, fruit, vegetables, legumes etc.).
  Jarred food market (e.g. jelly, peanut butter etc.).
  Prepared food market (e.g. prepared meal, leftovers etc.).

[1.5] Competition

The four major competitors in this field are (the):

Vacuum sealing machine: The most effective vacuuming process, however it is very expensive, requires continuous purchasing of vacuum bags, uses electricity, not practical, time consuming and messy.

Vacuum storage container: The most similar storage container to this invention, however it requires an additional pump to extract the air from the box, which is not practical. This container also cannot alter its size or volume so there is no storage saving benefit.

Collapsible food storage container: Although this is a space saving product, it generally only serves this function when it is empty. Also has no vacuum capability.

Vacuum Sealed Covers: Has some similarities but is not capable of internally stacking so does not significantly reduce storage space, which is one of my invention's primary claims. Also doesn't have vacuum holes or valves and no fitted covers.

Plastic Wrap: The most conventional and adaptable product in this area. However it is not environmentally friendly as it is not reusable and isn't really suitable for long-term storage as it can't produce a vacuum.

[1.6] Identifying the Problems

The problems that this invention is attempting to address are:

Storage: For example, containers that are less than full taking up the storage space of the full container. For example a two-liter volume food or drink container that only contains one liter of product still takes up two liters of space in the refrigerator.

Longevity: For example, most fruit and vegetables, homemade soups, sauces etc. have a short lifespan in the refrigerator. The same is true for drinks like milk. This longevity is further decreased when food is left out of the refrigerator.

Longevity of canned/jarred food after opening: For example, food in cans (e.g. beans, fish, fruit etc.) will quickly expire once air has been let in to the can. This applies to a lesser extent to jarred foods as well (e.g. jelly, peanut butter etc.).

Scattering of items stored within: For example, when people bring food to work or school with them in a lunch box, they normally find that the food is scattered all over the box by the time they open it (e.g. sandwiches that have to be remade).

Wastage: Apart from a huge percentage of household food that is destroyed each year due to expiration, there is also a huge amount of non-reusable products produced each year (e.g. Plastic Wrap, Vacuum Wrap etc.) to address food longevity. Paradoxically these non-reusable products are sent to the same landfill sites as the wasted food.

SECTION 2 BRIEF SUMMARY OF THE INVENTION

[2.1] Brief Summary

This invention consists of, but is not limited to, two marketable products that perform the following primary functions. Firstly to create a vacuum within a storage space through depression (without an additional instrument(s) such as a pump). Secondly to reduce the wasted space associated with storage by internally stacking such containers (i.e. stacking one container inside another container whilst cover is in a depressed state.

SECTION 3 BRIEF OUTLINE OF THE DRAWINGS

[3.1] Introduction to Drawings:

The drawings contained within this patent are marked from [FIG. 1.1] through to [FIG. 5.6] at the back. There are a total of thirty additional pages of drawings contained within this patent to help give a clearer description of the functionality of the single invention over a variety of different markets. In one case where the market is different but the function is still identical the markets have been grouped together with one single series of drawings (i.e. General Food Storage and General Storage). In all other cases each market has its own set of drawing, which will have some minor/major alterations from other markets, but with the same basic functionality of the invention. The functionalities of the invention with reference to the drawing will be described in more detail in Section 4.

N.B. These Designs are Provisional and are Subject to Change.

[3.2] List of Drawings:

The following is a list of the drawings as they appear in the drawings section:

[3.2.1] General Food Storage & General Storage
    [FIG. 1.1] Views
    [FIG. 1.1.1] Elevation
    [FIG. 1.1.2] End-View
    [FIG. 1.1.3] Plan
    [FIG. 1.2] Perspective
    [FIG. 1.3] Components
    [FIG. 1.4] Process—Pack, Vac and Stack
    [FIG. 1.4.1] Pack
    [FIG. 1.4.2] Vac
    [FIG. 1.4.3] Stack
    [FIG. 1.5] Problem vs. Solution
    [FIG. 1.5.1] Problem
    [FIG. 1.5.2] Solution
    [FIG. 1.6] Variations on the Design

[3.2.2] Liquid Food Storage
    [FIG. 2.1] Views
    [FIG. 2.1.1] Elevation
    [FIG. 2.1.2] End-View
    [FIG. 2.1.3] Plan
    [FIG. 2.2] Perspective
    [FIG. 2.3] Components
    [FIG. 2.4] Process—Pack, Vac and Stack
    [FIG. 2.4.1] Pack
    [FIG. 2.4.2] Vac
    [FIG. 2.4.3] Stack
    [FIG. 2.5] Problem vs. Solution
    [FIG. 2.5.1] Problem
    [FIG. 2.5.2] Solution
    [FIG. 2.6] Variations on the Design

[3.2.3] Cereal Storage
    [FIG. 3.1] Views.
    [FIG. 3.1.1] Elevation
    [FIG. 3.1.2] End-View
    [FIG. 3.1.3] Plan
    [FIG. 3.2] Perspective
    [FIG. 3.3] Components
    [FIG. 3.4] Process—Pack, Vac and Stack
    [FIG. 3.4.1] Pack
    [FIG. 3.4.2] Vac
    [FIG. 3.4.3] Stack
    [FIG. 3.5] Problem vs. Solution
    [FIG. 3.5.1] Problem
    [FIG. 3.5.2] Solution
    [FIG. 3.6] Variations on the Design

[3.2.4] Beverage Storage
    [FIG. 4.1] Views
    [FIG. 4.1.1] Elevation
    [FIG. 4.1.2] End-View
    [FIG. 4.1.3] Plan
    [FIG. 4.2] Perspective
    [FIG. 4.3] Components
    [FIG. 4.4] Process—Pack, Vac and Stack
    [FIG. 4.4.1] Pack
    [FIG. 4.4.2] Vac
    [FIG. 4.4.3] Stack
    [FIG. 4.5] Problem vs. Solution
    [FIG. 4.5.1] Problem
    [FIG. 4.5.2] Solution
    [FIG. 4.6] Variations on the Design

[3.2.5] Canned and Jarred Food Storage (Cover Only Design)
    [FIG. 5.1] Views
    [FIG. 5.1.1] Elevation
    [FIG. 5.1.2] End-View
    [FIG. 5.1.3] Plan
    [FIG. 5.2] Perspective
    [FIG. 5.3] Components
    [FIG. 5.4] Process—Seal, Vac and Stack
    [FIG. 5.4.1] Seal (1)
    [FIG. 5.4.2] Seal (2)
    [FIG. 5.4.3] Vac
    [FIG. 5.4.4] Stack
    [FIG. 5.5] Problem vs. Solution
    [FIG. 5.5.1] Problem
    [FIG. 5.5.2] Solution
    [FIG. 5.6] Variations on the Design

SECTION 4 DETAILED DESCRIPTION

[4.1] Introduction

This section will describe the two marketable products with same function (i.e. storage containers with covers and individual storage covers) in their relevant market in detail with reference to the drawings and the following points:
    References (cross-referenced numerals from drawings).
    General description of the product design (with reference to the Views and the Perspective drawings)
    Components of the products (with reference to the Components drawings).
    Process of using the product (with reference to the Process drawings)
    An outline of the solutions that the product provides (with reference to the Problem vs. Solution drawings).
    Variations of the design.

[4.1.1] General Food Storage & General Storage

The following subsections will deal with the references' specifications, detailed descriptions and best mode(s) of implementation along with other features relating to the Vac n' Stack storage container for general food storage and general storage:

[4.1.1.1] References (Cross-Referenced Numerals from Drawings Contained in the FIG. 1 Section)

The following numeral references are for those contained in [FIG. 1.1] (i.e. the Elevation, the End-view and the Plan) and [FIG. 1.2] (i.e. the Perspective). Numeral references for the Components and Process drawings will each be outlined in their respective subsection (i.e. [4.1.1.3] for Components and [4.1.1.4] for Process):
1. Main Container
2. Cover
3. Twist n' Vac Circle
4. Vac-Hole (or Valve)
5. Gasket
6. Outer Perimeter of Cover
7. Stretchable Band
8. Push n' Vac Center-Part (depressible part)

[4.1.1.2] General Description of the Product Design (with Reference to the Views and the Perspective Drawings)

The storage container design shown for general food storage and general storage in [FIG. 1.1] and [FIG. 1.2] is for a three-dimensional isosceles trapezoid shaped product with the following basic observations:

The Elevation [FIG. 1.1.1] shows a two dimensional isosceles trapezoid (with rectangular cover).
The End-View [FIG. 1.1.2] shows a two dimensional isosceles trapezoid (with rectangular cover).
The Plan [FIG. 1.1.3] shows a two dimensional rectangle with circle in the center.
The Perspective [FIG. 1.2] shows a three-point perspective of the three-dimensional isosceles trapezoid (with rectangular cover).

These designs are very much provisional and do not represent the final design of the invented product. The aim of these designs is to outline the basic details and functions of the product in a simplistic manner. General lines on the drawings show what can normally be seen from the respective view(s), whereas (in some cases) broken lines show hidden details that one may not expect to see from the respective view(s).

As seen from the Elevation [FIG. 1.1.1] and the End-View [FIG. 1.1.2] the base of the Vac n' Stack storage container must be smaller than the Push n' Vac Center-Part of the cover. This is to ensure that the stackable feature can be implemented. Whilst the majority of storage containers are never full, they are usually filled above the 50% mark; therefore the suggested maximum target range of stackable storage-saving space should be in the region of 50%. In order to achieve a maximum stackable storage saving of approximately 50%, it is estimated that the base area will have to be approximately 12% smaller than the cover's Push n' Vac Center-Part: This can easily be achieved by finding the most appropriate balance between the size of the Push n' Vac Center-Part and the storage container's base. In order to maximize storage area it would be proposed to have the largest base possible and to counteract this by assigning the cover's dimensions to include having a smaller Outer Perimeter and larger Push n' Vac Center-Part as outlined in the Elevation [FIG. 1.1.1], the End-View [FIG. 1.1.2], the Plan and the Perspective [FIG. 1.2].

The provisional Plan design [FIG. 1.1.3] and the provisional Perspective design [FIG. 1.2] shows a Stretchable Band (manufactured from a strong, stretchable and highly durable material e.g. thermoplastic polyurethane or nitrile butadiene rubber). This Stretchable Band will connect the Outer Perimeter to the Push n' Vac Center-Part via a high quality airtight seal that will run along the inside lining of the Outer Perimeter and the outside lining of the Push n' Vac Center-Part. As this Stretchable. Band will be stretched to perform the Vac n' Stack's primary functions, it is essential that the Stretchable Band is made of a high quality, durable material. Furthermore the airtight seal that will connect the Stretchable Band to the Stretchable Outer Perimeter and the Push n' Vac Center-Part should be applied using a high-quality technique. This is to ensure that the Vac n' Stack Cover continues to be functional for as long as possible. Similarly it should be noted that the same high quality airtight seal is achieved when one puts on the cover, which may be only feasible through the attachment of a gasket to either the container or the cover.

The provisional Plan [FIG. 1.1.3] and the provisional Perspective design [FIG. 1.2] also shows a Twist n' Vac Circle (located in the center of the Push n' Vac Center-Part). The Twist n' Vac Circle has two notable features. Firstly it contains the Vac-Hole (or possibly a valve), which is used to expel air, and then sealed to create a vacuum. Alternatively it is also used to release a vacuum by unsealing it and allowing air to be sucked back into the container. Secondly the Twist n' Vac Circle has two grooves for the index and middle finger. At this stage for this particular product for the general food storage and general storage market it is suggested that the vacuum function be implemented by inserting the index and middle finger into these two grooves and applying pressure downwards. This will result in the Stretchable Band stretching, the Push n' Vac Center-Part of the cover being lowered down into the container and air being forced out of the Vac-Hole. Once the inside of the Push n' Vac Center-Part makes contact with the item(s) stored inside the storage container, the index finger and the middle finger should move in a clockwise motion to seal the Vac-Hole and secure a vacuum (though this is possibly not necessary with a valve). This process will be discussed in more detail in the Process sub-section [4.1.1.4].

[4.1.1.3] Components of the Product (with Reference to the Components' Drawings)

This sub-section-will briefly detail each individual component that is currently needed to construct a Vac n' Stack storage container for general food and general storage. Unlike the General Description sub-section [4.1.1.2] and the Process sub-section [4.1.1.4], it will not detail the functionality of the components, but rather briefly outline their requirements. All components outlined here can be visually cross-referenced in [FIG. 1.3] by their assigned numeral below. This list is provisional and subject to review:

1. Vac n' Stack Storage Container: Much the same as any storage container except that its base is required to be smaller than the Push n' Vac Center-Part. It may contain a circular indent on its outside base to create an even more secure fit when it is stacked on top of the Vac n' Twist Circle of another similar Vac n' Stack storage container. It may also contain a gasket around where it locks into contact with the Outer Perimeter of the cover. It may be manufactured from a range of materials (e.g. plastic, glass etc.)

2. Outer Perimeter of the cover: This outer-part must form an airtight seal with both the outer edges of the storage container (with the possible use of a Gasket) and the outer edges of the Stretchable Band. This piece of the cover may be possibly manufactured from the same material as both the depressible Push n' Vac Center Part and the Twist n' Vac Circle.

3. Gasket: May be used to further enhance the required airtight seal that is needed between the storage container and the Outer Perimeter (and possibly on the inner and outer edges of the Stretchable Band).

4. Stretchable Band: Made from a high quality flexible material, it is connected via an airtight seal to the Outer Perimeter and the Push n' Vac Center-Part. It's stretchability allows the Push n' Vac Center-Part to be pushed downwards in order to create a vacuum, thus helping to turn the Push n' Vac Center-Part into a platform whereby another storage container can be placed, reducing the amount of storage space needed.

5. Push n' Vac Center-Part: This inner-part of the cover will feature a Vac-Hole (or valve) and small pivot which the Twist n' Vac Circle will be attached to and rotated around to seal and open the Vac-Hole. It is suggested that this part of the product will be made from the same material as the Outer Perimeter and Twist n' Vac Circle.

6. Twist n' Vac Circle: This rotatable device will be positioned on the pivot in the center of the Push n' Vac Center. It will be raised slightly to the same level as the Push n' Vac Center Part's raised perimeters in order to provide a stable platform for another storage container to be stacked on top of it. It will have the ability to be rotated clockwise and anti-clockwise in order to seal and release a vacuum. A gasket may be needed to ensure that the seal is airtight. Whilst it may be manufactured from the same material as the Outer Perimeter and the Push n' Vac Center Part, there is the possibility of using a more attractive material (e.g. silicone) as it could be considered the centerpiece of this product.

[4.1.1.4] Process of Using the Product (with Reference to the Process Drawings)

It's as easy as Pack, Vac and Stack [FIG. 1.4]:

Pack: Simply put the item(s) that you wish to have stored into your storage container. For maximum efficiency you should make sure your general item(s) or food item(s) is/are evenly dispersed in the container [FIG. 1.4.1].

Vac: Once you have finished packing your storage container (with food or clothes etc.), put on the cover and ensure that it is tightly closed. Making sure that the Vac-Hole is open, insert your index finger and middle finger into the two grooves in the Twist n' Vac Circle on the cover. Applying a gentle pressure, push downwards. The Stretchable Band should begin to stretch, whilst the Push n' Vac Center Part is gently forced downwards or depressed. As this is happening air is being forced out of the Vac-Hole. Once the inside of the Push n' Vac Center-Part makes contact with the food (or other items) stored inside the storage container, it's simply a matter of sealing the Vac-Hole shut by twisting the Twist n' Vac Circle (possibly not necessary with a valve). You have now created a vacuum inside the storage container, whilst also creating an internal platform to stack another Vac n' Stack storage container in order to save valuable storage space [FIG. 1.4.2].

Stack: With the vacuum now in place, the Push n' Vac Center-Part of the cover now acts as a platform on which you can stack another Vac n' Stack container to increase your storage efficiency. Simply place another Vac n' Stack storage container into the space that has been created from the Push n' Vac Center-Part being forced down (depressed). Due to its design the base of the other container should easily pass into this newly created opening and rest securely on the platform that has been created for it by the Push n' Vac Center-Part. This action of securely stacking containers on top of each other can be repeated many times, saving huge amounts of storage space in the refrigerator and elsewhere [FIG. 1.4.3].

[4.1.1.5] Outline of the Product's Primary Solutions (with Reference to the Problem vs. Solution Drawings)

This subsection will provide a brief overview of the advantages of the Vac n' Stack storage container based on [FIG. 1.5]. These are accurately scaled drawings to help illustrate some of the key benefits (primarily with regards to space-saving):

1. Space-Saving: As the scaled drawings illustrate [FIG. 1.5.1] and [FIG. 1.5.2], a lot of space can be saved by using the Vac n' Stack storage containers. The drawing of the problem shows a lot of wasted space with conventional storage containers. The solution shows minimal wasted space through the Vac n' Stack method.

2. Food-Longevity: Food stored in a vacuum stays fresher for longer and unlike other more inconvenient methods of vacuum packing, you have instant access to your vacuum packed food at any time. Just release the vacuum and reseal it again when you're finished. No need to get the vacuuming machine out every time you cut open a vacuum packed bag. Furthermore due to the airtight function you don't have to worry about any insect infestations.

3. Food Compression: No need to worry what lunch will look like when you finally open your food storage container. Due to the fact that the food is compressed, it is very unlikely it will look any different from when it was packed.

[4.1.1.6] Variations of the Design

This subsection deals with possible variations of the design. One such design variation [FIG. 1.6] is to have a small piece of plastic sticking out from opposite sides of the Outer Perimeter of the cover, which can lock into another similar container (which would have corresponding grooves on its sides) when it is stacked into it to ensure an even more secure fit.

It may be considered that the Main Container may be tinted with a dark color. This will further extend the longevity of the stored product, as it will greatly reduce sunlight exposure. However many consumers like to see what is stored inside their containers. The first of two alternatives could be to market both, i.e. a clear and dark-tinted product with their advantages and let the consumer make the decision. The second alternative could be to market a dark-tinted product, which has a clear design, incorporated into it (perhaps the product's brand name) so the consumer can still see inside with minimal sunlight exposure to the food.

[4.1.2] Liquid Food Storage

The following subsections will deal with the references' specifications, detailed descriptions and best mode(s) of implementation along with other features relating to the Vac n' Stack storage container for Liquid Food Storage:

[4.1.2.1] References (cross-referenced numerals from drawings contained in the FIG. 2 section)

The following numeral references are for those contained in [FIG. 2.1] (i.e. the Elevation, the End-view and the Plan) and [FIG. 2.2] (i.e. the Perspective). Numeral references for the Components and Process drawings will each be outlined in their respective subsection (i.e. [4.1.2.3] for Components and [4.1.2.4] for Process):

1. Main Container
2. Cover
3. Slide n' Vac Switch
4. Vac-Hole (or Valve)
5. Gasket
6. Outer Perimeter of Cover
7. Stretchable Band
8. Push n' Vac Center-Part (depressible part)

[4.1.2.2] General Description of the Product Design (with Reference to the Views and the Perspective Drawings)

The storage container design shown for Liquid Food Storage in [FIG. 2.1] and [FIG. 2.2] is for a three-dimensional isosceles trapezoid shaped product with the following basic observations:

The Elevation [FIG. 2.1.1] shows a two dimensional isosceles trapezoid (with rectangular cover).
The End-View [FIG. 2.1.2] shows a two dimensional isosceles trapezoid (with rectangular cover).
The Plan [FIG. 2.1.3] shows a two dimensional rectangle.
The Perspective [FIG. 2.2] shows a three-point perspective of the three-dimensional isosceles trapezoid (with rectangular cover).

These designs are very much provisional and do not represent the final design of the invented product. The aim of these designs is to outline the basic details and functions of the product in a simplistic manner. General lines on the drawings show what can normally be seen from the respective view(s), whereas (in some cases) broken lines show hidden details that one may not expect to see from the respective view(s).

As seen from the Elevation [FIG. 2.1.1] and the End-View [FIG. 2.1.2] the base of the storage container must be smaller than the Push n' Vac Center-Part of the cover. This is to ensure that the stackable feature can be implemented. Whilst the majority of storage containers are never full, they are usually filled above the 50% mark; therefore the suggested maximum target range of stackable storage-saving space should be in the region of 50%. In order to achieve a maximum stackable storage saving of approximately 50%, it is estimated that the base area will have to be approximately 12% smaller than the cover's Push n' Vac Center-Part. This can easily be achieved by finding the most appropriate balance between the size of the Push n' Vac Center-Part and the storage container's base. In order to maximize storage area it would be proposed to have the largest base possible and to counteract this by assigning the cover's dimensions to include having a smaller Outer Perimeter and larger Push n' Vac Center-Part. However, unlike the General Food Storage, for the Liquid Food Storage market there is not a Twist n' Vac Circle in the center of the cover. Instead as seen from the Plan [FIG. 2.3] there is a Slide n' Vac Switch located on the left-hand side of the Outer Perimeter of the cover (the reason for this will be explained in the final paragraph of this subsection and in [4.1.2.4]). The inclusion of the Slide n' Vac Switch for the Liquid Food market means that the Outer Perimeter may need to be a bit larger, which in turn may reduce the size of the Push n' Vac Center Part. In turn this will result in a smaller base, which may lower the overall internal volume of the Liquid Food storage container. However as liquid foods can be forced upwards (unlike solid foods) alongside the walls of the container when downward pressure is applied to the depressible Push n' Vac Center Part, a 100% vacuum can be achieved. This means that not only does the Liquid Food storage container preserves liquids for longer, it may also save more space in some instances.

The provisional Plan design [FIG. 2.1.3] and the provisional Perspective design [FIG. 2.2] shows a Stretchable Band (manufactured from a strong, stretchable and highly durable material e.g. thermoplastic polyurethane or nitrile butadiene rubber). This Stretchable Band will connect the Outer Perimeter to the depressible Push n' Vac Center Part via a high quality airtight seal that will run along the inside lining of the Outer Perimeter and the outside lining of the Push n' Vac Center-Part. As this Stretchable Band will be stretched to perform the Vac n' Stack's primary functions, it is essential that the Stretchable Band is made of a high quality, durable material. Furthermore the airtight seal that will connect the Stretchable Band to the Stretchable Outer Perimeter and the Push n' Vac Center-Part should be applied using a high-quality technique. This is to ensure that the Vac n' Stack Cover continues to be functional for as long as possible. Similarly it should be noted that the same high quality airtight seal is achieved when one puts on the cover, which may be only feasible through the attachment of a gasket to either the container or the cover.

The provisional Plan [FIG. 2.1.3] and the provisional Perspective design [FIG. 2.2] also shows a Slide n' Vac Switch (located on the left-hand side of the Outer Perimeter). The Slide n' Vac Switch has two notable features. Firstly it contains the Vac-Hole (possibly a valve), which is used to expel air, and then sealed to create a vacuum. Alternatively it is also used to release a vacuum by unsealing it and allowing air to be sucked back into the container. At this stage for this particular product for the liquid food storage market it is suggested that the vacuum function be implemented by firstly holding the sides of the container with both hands. Next, one should apply a gentle downward pressure on the depressible Center-Part by using both thumbs. The Stretchable Band will begin to stretch downwards as the Center-Part is lowered or depressed. For the Liquid Food storage container, it's highly recommended to keep applying pressure after the Center-Part makes contact with the food stored inside. This will force the liquid food upwards towards the Vac-Hole. Once the liquid food reaches the Vac-Hole, one can use their index finger to push the Slide n' Vac Switch to secure a 100% vacuum (possibly not necessary with a valve). This entire process will be discussed in more detail in the Process sub-section [4.1.2.4].

[4.1.2.3] Components of the Product (with Reference to the Components' Drawings)

This sub-section will briefly detail each individual component that is currently needed to construct a Vac n' Stack storage container for liquid food. Unlike the General Description sub-section [4.1.2.2] and the Process sub-section [4.1.2.4], it will not detail the functionality of the components, but rather briefly outline their requirements. All components outlined here can be visually cross-referenced in [FIG. 2.3] by their assigned numeral below. This list is provisional and subject to review:

1. Vac n' Stack Storage Container: Much the same as any storage container except that its base is required to be smaller than the Push n' Vac Center-Part (which for the Liquid Food storage container may mean a smaller base than the General Food and General Storage container). It may be manufactured from a range of materials (e.g. plastic, glass etc.). It may also contain a gasket around its outer edges where it locks into contact with the Outer Perimeter of the cover.
2. Outer Perimeter of the cover: This outer-part must form an airtight seal with both the outer edges of the storage container (with the possible use of a Gasket) and the outer edges of the Stretchable Band. For the Liquid Food storage container it will also feature a Vac-Hole (or valve) on the far left-hand side (or far right-hand side). The Outer Perimeter may be possibly manufactured from the same material as the Push n' Vac Center-Part.
3. Slide n' Vac Switch: A small curved capsule-shaped switch that will be fitted on to the Outer Perimeter with the function of sealing and releasing the vacuum contained inside the storage container. May be made from the same material as the Outer Perimeter and possibly covered with a more comfortable material (e.g. silicone). The Slide n' Vac Switch may also need an underlying gasket to ensure an airtight seal (alternatively it may be replaced by a valve).

4. Gasket: May be used to further enhance the required airtight seal that is needed between the storage container and the Outer Perimeter (and possibly on the inner and outer edges of the Stretchable Band).

5. Stretchable Band: Made from a high quality flexible material, it is connected via an airtight seal to the Outer Perimeter and the depressible Push n' Vac Center-Part. Its stretchability allows the Push n' Vac Center-Part to be pushed downwards in order to create a vacuum, thus helping to turn the Push n' Vac Center-Part into a platform whereby another storage container can be placed reducing the amount of storage space needed.

6. Push n' Vac Center-Part: This inner-part of the cover for the Liquid Foods brand will not have any particular features. It will act as a stacking platform so it may have some indents in its design to allow another similar Vac n' Stack storage container to sit securely on top of it. It is suggested that this part of the product will be made from the same material as the Outer Perimeter and Slide n' Vac Switch.

[4.1.2.4] Process of Using the Product (with Reference to the Process Drawings)

It's as easy as Pack, Vac and Stack [FIG. 2.4]:

Pack: Simply pour the liquid food (e.g. soup, sauce etc.) that you wish to have stored into your storage container. Generally speaking, liquid foods will evenly disperse inside the container, however for thicker liquid foods or liquid foods that contain solids you should make sure it is evenly dispersed for maximum efficiency [FIG. 2.4.1].

Vac: Once you have finished packing your Liquid Food storage container, put on the cover and ensure that it is tightly closed. Tilt the storage container slightly so that the side with the Vac-Hole (or valve) is raised (this technique will help ensure a 100% vacuum seal). Making sure that the Vac-Hole is open, apply a gentle pressure downwards on the depressible Push n' Vac Center-Part. The Stretchable Band should begin to stretch, whilst the Push n' Vac Center-Part is gently forced downwards or depressed. As this is happening air is being forced out of the Vac-Hole. Unlike the General Food storage container, once the inside of the Push n' Vac Center-Part makes contact with the liquid food stored inside, you can continue to push downwards, which will force the liquid food upwards along the sides of the container. As the storage container is tilted upwards on the Vac-Hole side, once the liquid food reaches the Vac-Hole you will know that all of the air inside the container has been expelled. You can now slide the Slide n' Vac Switch forward to secure a complete 100% vacuum (though possibly not necessary with a valve), whilst also creating an internal platform to stack another Vac n' Stack storage container in order to save valuable storage space [FIG. 2.4.2].

Stack: With the vacuum now in place, the Push n' Vac Center-Part of the cover now acts as a platform on which you can stack another Vac n' Stack container to increase your storage efficiency. Simply place another Vac n' Stack storage container into the space that has been created from the Push n' Vac Center-Part being forced down or depressed. Due to its design, the base of the other container should easily pass into this newly created space and rest securely on the platform that has been created for it by the depressed Push n' Vac Center Part. This action of securely stacking containers on top of each other can be repeated many times, saving huge amounts of storage space in the refrigerator [FIG. 2.4.3].

[4.1.2.5] Outline of the Product's Primary Solutions (with Reference to the Problem vs. Solution Drawings)

This subsection will provide a brief overview of the advantages of the Vac n' Stack Liquid Food storage container based on [FIG. 2.4]. These are accurately scaled drawings to help illustrate some of the key benefits (primarily with regards to space-saving):

1. Space-Saving: As the scaled drawings illustrate [FIG. 2.5.1] and [FIG. 2.5.2], a lot of space can be saved by using the Vac n' Stack storage containers. The drawing representing the problem shows a lot of wasted space with conventional storage containers. The solution shows minimal wasted space through the Vac n' Stack method.

2. Food-Longevity: Food stored in a 100% vacuum stays fresher for much longer and unlike other more inconvenient methods of vacuum packing, you have instant access to your vacuum packed food at any time. Just release the vacuum and reseal it again when you're finished. No need to get the vacuuming machine out every time you cut open a vacuum packed bag.

[4.1.2.6] Variations of the Design

This subsection deals with possible variations of the design. One such design variation [FIG. 2.6] is to have a small piece of plastic sticking out from opposite sides of the Outer Perimeter of the cover, which can lock into another similar container (which would have corresponding grooves on its sides) that is stacked into it to ensure an even more secure fit.

Also instead of a Slide n' Vac Switch, a small tube could be used. Once it can be observed that the liquid food has been forced up the tube, one can assume all the air has been expelled and it can be sealed, possibly with an attachment. As this would be still on the Outer Perimeter it should have no effect on the stacking feature.

It may be considered that the Main Container may be tinted with a dark color. This will further extend the longevity of the stored product, as it will greatly reduce sunlight exposure. However many consumers do like to see what is stored inside their containers. The first of two alternatives could be to market both a clear and dark-tinted product with their advantages and let the consumer make the decision. The second alternative could be to market a dark-tinted product, which has a clear design, incorporated into it (perhaps the product's brand name) so the consumer can still see inside with minimal sunlight exposure to the food.

[4.1.3] Cereal Storage

The following subsections will deal with the references' specifications, detailed descriptions and best mode(s) of implementation along with other features relating to the Vac n' Stack storage container for Cereal Foods (e.g. breakfast cereals, rice, pasta, flour etc.). Although there is a variation in the design of this product, its functionality works on the same principals as the initial container.

[4.1.3.1] References (Cross-Referenced Numerals from Drawings Contained in the FIG. 3 Section)

The following numeral references are for those contained in [FIG. 3.1] (i.e. the Elevation, the End-view and the Plan) and [FIG. 3.2] (i.e. the Perspective). Numeral references for the Components and Process drawings will each be outlined in their respective subsection (i.e. [4.1.3.3] for Components and [4.1.3.4] for Process):

1. Main Container
2. Slide-in Product Nametag
3. Spout
4. Cover
5. Handle
6. Twist n' Vac Circle
7. Vac-Hole (or Valve)
8. Gasket
9. Outer Perimeter of Cover
10. Stretchable Band
11. Push n' Vac Center Part (depressible part)

[4.1.3.2] General Description of the Product Design (with Reference to the Views and the Perspective Drawings)

The storage container design shown for cereal food storage [FIG. 3.1] and [FIG. 3.2] is for a three-dimensional isosceles trapezoid shaped product with an additional Spout for pouring and a Handle for holding. It will be taller and narrower that the general food storage container with a somewhat irregular cuboid inspired design, which will have some similarities to the conventional cereal box. The following basic observations can be made from viewing the drawings in [FIG. 3.1] and [FIG. 3.2]:

The Elevation [FIG. 3.1.1] shows a two dimensional isosceles trapezoid with additional Spout and Handle (with basic rectangular cover with additional semi-circular end on the left-hand side to cover the Spout).

The End-View [FIG. 3.1.2] shows a two dimensional isosceles trapezoid (with basic rectangular cover with additional semi-circular end on the left-hand side to cover the Spout).

The Plan [FIG. 3.1.3] shows a two dimensional rectangle (with features) with semi-circular Spout and Handle.

The Perspective [FIG. 3.2] shows a three-point perspective of the three-dimensional isosceles trapezoid (with rectangular cover, features, Spout and Handle).

These designs are very much provisional and do not represent the final design of the invented product. The aim of these designs is to outline the basic details and functions of the product in a simplistic manner. General lines on the drawings show what can normally be seen from the respective view(s), whereas (in some cases) broken lines show hidden details that one may not expect to see from the respective view(s).

As seen from the Elevation [FIG. 3.1.1] and the End-View [FIG. 3.1.2] the base of the Vac n' Stack storage container for cereal foods must be smaller than the depressible Push n' Vac Center Part of the cover. This is to ensure that the stackable feature can be implemented. Whilst the majority of storage containers are never full, they are usually filled above the 50% mark; therefore the suggested maximum target range of stackable storage-saving space should be in the region of 50%. In order to achieve a maximum stackable storage saving of approximately 50%, it is estimated that the base area will have to be approximately 16% smaller than the cover's depressible Push n' Vac Center-Part. This can easily be achieved by finding the most appropriate balance between the size of the depressible Push n' Vac Center-Part and the storage container's base. In order to maximize storage area it would be proposed to have the largest base possible and to counteract this by assigning the cover's dimensions to include having a smaller Outer Perimeter and larger Push n' Vac Center Part as outlined in the Elevation [FIG. 3.1.1], the End-View [FIG. 3.1.2], the Plan [FIG. 3.1.3] the Perspective [FIG. 3.2].

The Elevation [FIG. 3.1.1], the End-View [FIG. 3.1.2], the Plan [FIG. 3.1.3] and the Perspective [FIG. 3.2] all show the Vac n' Stack storage container for cereal foods to have a Spout, a Handle and a Slide-in Product Nametag. The Spout allows for the easy pour of the product from the container. In this current design the Spout is only operable when the cover is removed (however this is addressed in Variations of the Design [4.1.3.6]). The Handle also accommodates the easy-pour function as it allows the storage container to be easily held at an angle. The Slide-in Product Nametag allows the consumer to be easily able to identify which storage container they want, as it may be confusing if a number of cereals are packed on top of each other. It should be designed to allow a consumer to easily slide in the torn-off cardboard cover of a cereal box (bearing the brand name) for quick and easy identification.

The provisional Plan design [FIG. 3.1.3] and the provisional Perspective design [FIG. 3.2] shows a Stretchable Band (manufactured from a strong, stretchable and highly durable material e.g. Thermoplastic polyurethane or Nitrile butadiene rubber). This Stretchable Band will connect the Outer Perimeter to the Push n' Vac Center-Part via a high quality airtight seal that will run along the inside lining of the Outer Perimeter and the outside lining of the Push n' Vac Center-Part. As this Stretchable Band will be stretched to perform the Vac n' Stack's primary functions, it is essential that the Stretchable Band is made of a high quality, durable material. Furthermore the airtight seal that will connect the Stretchable Band to the Stretchable Outer Perimeter and the Push n' Vac Center-Part should be applied using a high-quality technique. This is to ensure that the Vac n' Stack Cover continues to be functional for as long as possible. Similarly it should be noted that the same high quality airtight seal is achieved when one puts on the cover, which may be only feasible through the attachment of a gasket to either the container or the cover.

The provisional Plan [FIG. 3.1.3] and the provisional Perspective design [FIG. 3.2] also shows a Twist n' Vac Circle (located in the center of the Push n' Vac Center-Part). The Twist n' Vac Circle has two notable features. Firstly it contains the Vac-Hole (or valve), which is used to expel air, and then sealed to create a vacuum. Alternatively it is also used to release a vacuum by unsealing it and allowing air to be sucked back into the container. Secondly the Twist n' Vac Circle has two grooves for the index and middle finger to fit in. At this stage for this particular product for the cereal food storage market it is suggested that the vacuum function be implemented by inserting the index and middle finger into the these two grooves and applying pressure downwards. This will result in the Stretchable Band stretching, the Push n' Vac Center-Part of the cover being depressed downwards into the container and air being forced out of the Vac-Hole (or valve). Once the inside of the Push n' Vac Center-Part makes contact with the product stored inside the storage container, the index finger and the middle finger should move in a clockwise motion to seal the Vac-Hole and secure a vacuum (though possibly not necessary with a valve). This entire process will be discussed in more detail in the Process sub-section [4.1.3.4].

[4.1.3.3] Components of the Product (with Reference to the Components' Drawings)

This sub-section will briefly detail each individual component that is currently needed to construct a Vac n' Stack storage container for cereal foods. Unlike the General Description sub-section [4.1.3.2] and the Process sub-section [4.1.3.4], it will not detail the functionality of the components, but rather briefly outline their requirements. All components outlined here can be visually cross-referenced in [FIG. 3.3] by their assigned numeral below. This list is provisional and subject to review:

1. Vac n' Stack Storage Container: The overall design will be loosely based on the standard shape of the conventional cuboid cereal box with an additional Spout and Handle. However there will be some further variation, as in order to secure the stackability feature it is required that its base is to be smaller than the depressible Push n' Vac Center-Part. It may contain a circular indent on its outside base to create an even more secure fit when it is stacked on top of the Vac n' Twist Circle of another similar Vac n' Stack storage container. It may also contain a gasket around its outer edges where it locks into contact with the Outer Perimeter of the cover. It may be manufactured from a range of materials (e.g. plastic, glass etc.)
2. Outer Perimeter of the cover: This outer-part must form an airtight seal with both the outer edges of the storage container (with the possible use of a Gasket) and the outer edges of the Stretchable Band. This piece of the cover may be possibly manufactured from the same material as both the depressible Push n' Vac Center Part and the Twist n' Vac Circle.
3. Gasket: May be used to further enhance the required airtight seal that is needed between the storage container and the Outer Perimeter (and possibly on the inner and outer edges of the Stretchable Band).
4. Stretchable Band: Made from a high quality flexible material, it is connected via an airtight seal to the Outer Perimeter and the Push n' Vac Center-Part. Its stretchability allows the Push n' Vac Center-Part to be depressed downwards in order to create a vacuum, thus helping to turn the Push n' Vac Center-Part into a platform whereby another storage container can be placed, reducing the amount of storage space needed.
5. Push n' Vac Center-Part: This inner-part of the cover will feature a Vac-Hole (or valve) and small pivot which the Twist n' Vac Circle will be attached to and rotated around to seal and open the Vac-Hole. It is suggested that this part of the product will be made from the same material as the Outer Perimeter and Twist n' Vac Circle.
6. Twist n' Vac Circle: This rotatable device will be positioned on the pivot in the center of the Push n' Vac Center. It will be raised slightly to the same level as the Push n' Vac Center-Part's raised edges in order to provide a stable platform for another storage container to be stacked on top of it. It will have the ability to be rotated clockwise and anti-clockwise in order to seal and release a vacuum. A gasket may be needed to ensure that the seal is airtight. Whilst it may be manufactured from the same material as the Outer Perimeter and the Push n' Vac Center-Part, there is the possibility of using a more attractive material as it could be considered the centerpiece of this product.

[4.1.3.4] Process of Using the Product (with Reference to the Process Drawings)

It's as easy as Pack, Vac and Stack [FIG. 3.4]:

Pack: Simply pour the item(s) that you wish to have stored into your storage container. For maximum efficiency you should make sure your food is evenly dispersed in the container [FIG. 3.4.1].

Vac: Once you have finished filling your storage container (with cereal, pasta, rice etc.), put on the cover and ensure that it is tightly closed. Making sure that the Vac-Hole is open, insert your index finger and middle finger into the two grooves in the Twist n' Vac Circle on the cover. Applying a gentle pressure, push downwards. The Stretchable Band should begin to stretch, whilst the Push n' Vac Center-Part is gently forced downwards or depressed. As this is happening air is being forced out of the Vac-Hole. Once the inside of the Push n' Vac Center-Part makes contact with the product stored inside the storage container, it's simply a matter of sealing the Vac-Hole shut by twisting the Twist n' Vac Circle (though possibly not necessary with a valve). You have now created a vacuum inside the storage container, whilst also creating an internal platform to stack another similar Vac n' Stack storage container in order to save valuable space [FIG. 3.4.2].

Stack: With the vacuum now in place, the Push n' Vac Center-Part of the cover now acts as a platform on which you can stack another similar Vac n' Stack container to increase your storage efficiency. Simply place another Vac n' Stack storage container into the space that has been created from the Push n' Vac Center-Part being forced down. Due to its design the base of the other container should easily pass into this newly created opening and rest securely on the platform that has been created for it by the Push n' Vac Center-Part. Due to their positioning, the Spout and Handle also should not interfere with this stackability feature. This action of securely stacking containers on top of each other can be repeated many times, saving huge amounts of storage space in kitchen presses [FIG. 3.4.3].

[4.1.3.5] Outline of the Product's Primary Solutions (with Reference to the Problem vs. Solution Drawings)

This subsection will provide a brief overview of the advantages of the Vac n' Stack storage container based on [FIG. 3.5]. These are accurately scaled drawings to help illustrate some of the key benefits (primarily with regards to space-saving):

1. Space-Saving: As the scaled drawings illustrate [FIG. 3.5.1] and [FIG. 3.5.2], a lot of space can be saved by using the Vac n' Stack storage containers. The drawing representing the problem shows a lot of wasted space with conventional storage containers. The solution shows minimal wasted space through the Vac n' Stack method.
2. Food-Longevity: Food stored in a vacuum stays fresher for longer and unlike other more inconvenient methods of vacuum packing, you have instant access to your vacuum packed food at any time. Just release the vacuum and reseal it again when you're finished. No need to get the vacuuming machine out every time you cut open a vacuum packed bag. Furthermore due to the airtight function you don't have to worry about any insect infestations.

[4.1.3.6] Variations of the Design

This subsection deals with possible variations of the design. One such design variation [FIG. 3.6] is to have a small piece of plastic sticking out from opposite sides of the Outer Perimeter of the cover, which can lock into another container, (which would have corresponding grooves on its sides) when it is stacked into it to ensure an even more secure fit.

Also shown is the suggestion of having a flip-top function on the Spout portion of the cover so the whole cover does not need to be removed in order to pour the product from the container. However, at present, this will still require the vacuum to be released.

Alternatively to the flip-top function above, is the idea of using a Shut n' Vac Slide feature, similar to the proposal for the beverage storage container. The challenge here is to have a Vac-Hole that is large enough for cereal to pass through and small enough to remain airtight to secure the vacuum.

It may be considered that the Main Container may be tinted with a dark color. This will further extend the longevity of the stored product, as it will greatly reduce sunlight exposure. However many consumers like to see what is stored inside their containers. The first of two alternatives could be to market both i.e. a clear and dark-tinted product with their advantages and let the consumer make the decision. The second alternative could be to market a dark-tinted product, which has a clear design, incorporated into it (perhaps the product's brand name) so the consumer can still see inside with minimal sunlight exposure to the food.

[4.1.4] Beverage Storage

The following subsections will deal with the references' specifications, detailed descriptions and best mode of implementation along with other features relating to the Vac n' Stack storage container for Beverages:

[4.1.4.1] References (Cross-Referenced Numerals from Drawings Contained in the FIG. 4 Section)

The following numeral references are for those contained in [FIG. 4.1] (i.e. the Elevation, the End-view and the Plan) and [FIG. 4.2] (i.e. the Perspective). Numeral references for the Components and Process drawings will each be outlined in their respective subsection (i.e. [4.1.4.3] for Components and [4.1.4.4] for Process):

1. Main Container
2. Slide-in Product Nametag
3. Spout
4. Vac-Hole/Beverage Opening
5. Shut n' Vac Slide
6. Cover
7. Handle
8. Vac-Hole
9. Gasket
10. Outer Perimeter of Cover
11. Stretchable Band
12. Push n' Vac Center Part (depressible part)

[4.1.4.2] General Description of the Product Design (with Reference to the Views and the Perspective Drawings)

The storage container design shown for Beverage storage in [FIG. 4.1] and [FIG. 4.2] is for a three-dimensional isosceles trapezoid shaped product with an additional Spout for pouring and Handle for holding. It will be similar in height to the Cereal storage container, however it will be slightly wider and significantly shorter in length with the ability to fit neatly into the refrigerator door with the following basic observations:

The Elevation [FIG. 4.1.1] shows a two dimensional isosceles trapezoid with additional Spout and Handle (with basic rectangular cover).

The End-View [FIG. 4.1.2] shows a two dimensional isosceles trapezoid (with basic rectangular cover).

The Plan [FIG. 4.1.3] shows a two dimensional rectangle (with features) with triangular Spout and Handle.

The Perspective [FIG. 4.2] shows a three-point perspective of the three-dimensional isosceles trapezoid (with rectangular cover, features, Spout and Handle).

These designs are very much provisional and do not represent the final design of the invented product. The aim of these designs is to outline the basic details and functions of the product in a simplistic manner. General lines on the drawings show what can normally be seen from the respective view(s), whereas (in some cases) broken lines show hidden details that one may not expect to see from the respective view(s).

As seen from the Elevation [FIG. 4.1.1] and the End-View [FIG. 4.1.2] the base of the storage container must be smaller than the depressible Push n' Vac Center-Part of the cover. This is to ensure that the stackable feature can be implemented. Whilst the majority of beverage bottles are never full, they are usually filled above the 40% mark; therefore the suggested maximum target range of stackable storage-saving space should be in the region of 60%. In order to achieve a maximum stackable storage saving of approximately 60%, it is estimated that the base area will have to be approximately 15% smaller than the cover's Push n' Vac Center Part. This can easily be achieved by finding the most appropriate balance between the size of the depressible Push n' Vac Center-Part and the storage container's base. In order to maximize storage area it would be proposed to have the largest base possible and to counteract this by assigning the cover's dimensions to include having a smaller Outer Perimeter and larger Push n' Vac Center Part.

Unique to the Vac n' Stack storage container for Beverages is its Shut n' Vac Slide which can be clearly seen in the Plan [FIG. 4.1.3] and the Perspective [FIG. 4.2]. This feature replaces the Twist n' Vac and Slide n' Vac features in the other storage products. This slide allows the opening of the storage container to have a dual purpose of both an opening and a Vac-Hole. In doing so it is not necessary to remove the cover in order to release the vacuum and pour a drink. Furthermore as a beverage is a liquid and can be forced upwards towards the Vac-Hole, it is possible to achieve a very high level of vacuum with the Shut n' Vac Slide, preserving beverages for longer. This will be explained further in the final paragraph of this subsection and in [4.1.4.4]).

The Elevation [FIG. 4.1.1], the End-View [FIG. 4.1.2], the Plan [FIG. 4.1.3] and the Perspective [FIG. 4.2] all show the Vac n' Stack storage container for Beverages to have a Shut n' Vac Slide, a Spout, a Handle and a Slide-in Product Nametag. The Spout allows for the easy pour of the beverage from the container. In this current design the Spout is not covered by the cover (however there are alternative design suggestions in Variations of the Design [4.1.4.6]). The Handle also accommodates the easy-pour function as it allows the storage container to be easily held at an angle. The Slide-in Product Nametag allows the consumer to be easily able to identify which storage container they want, as it may be confusing if a number of beverages are packed on top of each other.

The provisional Plan design [FIG. 4.1.3] and the provisional Perspective design [FIG. 4.2] shows a Stretchable Band (manufactured from a strong stretchable material e.g. Thermoplastic polyurethane or Nitrile butadiene rubber). This Stretchable Band will connect the Outer Perimeter to the Push n' Vac Center-Part via a high quality airtight seal that will run along the inside lining of the Outer Perimeter and the outside lining of the depressible Push n' Vac Center-Part. As this Stretchable Band will be stretched to perform the Vac n' Stack's primary functions, it is essential that the Stretchable Band is made of a high quality, durable material. Furthermore the airtight seal that will connect the Stretchable Band to the Stretchable Outer Perimeter and the Push n' Vac Center-Part should be applied using a high-quality technique. This is to ensure that the Vac n' Stack Cover continues to be functional for as long as possible. Similarly it should be noted that the same high quality airtight seal is achieved when one puts on the cover, which may be only feasible through the attachment of a gasket to either the container or the cover.

The provisional Plan [FIG. 4.1.3] and the provisional Perspective design [FIG. 4.2] also shows a Shut n' Vac Slide (located at the opening of the Spout). The Shut n' Vac has several notable features. It is located just above the dual purpose Vac-Hole/Beverage Opening, when it is in its upright and inactive position. It can be used to create a vacuum by being pushed or depressed downwards to cover the Vac-Hole after the air has being expelled from the container. Alternatively it can be used to release a vacuum by being pulled upwards, thereby exposing the Vac-Hole/Beverage Opening and allowing a drink to be poured. At this stage for this particular product for the beverage storage market it is suggested that the vacuum function be implemented by applying pressure downwards on the depressible Center-Part with the right hand. This will result in the Stretchable Band stretching, the Push n' Vac Center-Part of the cover being lowered down into the container and air being forced out of the Vac-Hole/Beverage Opening. When the inside of the Push n' Vac Center-Part makes contact with the beverage stored inside the storage container, it is possible to keep pushing and force the beverage upwards along the sides of the container until it reaches the Vac-Hole at the top (similar to the Liquid Food storage container). Once the beverage reaches the Vac-Hole/Beverage Opening, the left hand can push the Shut n' Vac Slide downwards, thereby creating a vacuum. This entire process will be discussed in more detail in the Process sub-section [4.1.4.4].

[4.1.4.3] Components of the Product (with Reference to the Components Drawings)

This sub-section will briefly detail each individual component that is currently needed to construct a Vac n' Stack storage container for Beverages. Unlike the General Description sub-section [4.1.4.2] and the Process sub-section [4.1.4.4], it will not detail the functionality of the components, but rather briefly outline their requirements. All components outlined here can be visually cross-referenced in [FIG. 4.3] by their assigned numeral below. This list is provisional and subject to review:

1. Vac n' Stack Storage Container: This storage container will be loosely based around a tall cuboid shape, except that its base is required to be smaller than the Push n' Vac Center-Part to ensure the stackable feature. It will also have a small Spout to pour, a Vac-Hole and a Handle to enable easier pouring. It may be manufactured from a range of materials (e.g. plastic, glass etc.). It may also contain a gasket around its outer edges where it locks into contact with the Outer Perimeter of the cover.
2. Outer Perimeter of the cover: This outer-part must form an airtight seal with both the outer edges of the storage container (with the possible use of a Gasket) and the outer edges of the Stretchable Band. This piece of the cover will be possibly manufactured from the same material as both the Push n' Vac Center-Part and the Shut n' Vac Slide.
3. Shut n' Vac Slide: A Slide that will be fitted on to the Main Container, just inside the Spout with the function of sealing and releasing the vacuum contained inside the storage container. May be made from the same material as the Outer Perimeter and Push n' Vac Center-Part and possibly covered with a more comfortable material (e.g. Silicone). The Shut n' Vac Slide may also need a gasket to ensure an airtight seal.
4. Gasket: May be used to further enhance the required airtight seal that is needed between the storage container and the Outer Perimeter (and possibly on the inner and outer edges of the Stretchable Band).
5. Stretchable Band: Made from a high quality flexible material, it is connected via an airtight seal to the Outer Perimeter and the Push n' Vac Center Part. It's stretchability allows the Push n' Vac Center-Part to be push downwards in order to create a vacuum, thus helping to turn the Push n' Vac Center-Part into a platform whereby another storage container can be placed reducing the amount of storage space needed.
6. Push n' Vac Center-Part: This inner-part of the cover for the Beverage storage brand will not have any particular features. It will act as a platform to stack another storage container so it may have some indents in its design to allow another storage container to sit securely on top of it. It is suggested that this part of the product will be made from the same material as the Outer Perimeter and Shut n' Vac Slide.

[4.1.4.4] Process of Using the Product (with Reference to the Process Drawings)

It's as easy as Pack, Vac and Stack [FIG. 4.4]:

Pack: Simply pour the beverage (e.g. milk, wine etc.) that you wish to have stored into your storage container [FIG. 4.4.1]

Vac: Once you have finished pouring your beverage into the storage container, put on the cover and ensure that it is tightly closed. Tilt the storage container slightly so that the side with the Vac-Hole/Beverage Opening is raised (this technique will help ensure a very high vacuum seal). Making sure that the Vac-Hole is open, apply a gentle pressure downwards on the depressible Push n' Vac Center-Part. The Stretchable Band should begin to stretch, whilst the Push n' Vac Center-Part is gently forced downwards or depressed. As this is happening air is being forced out of the Vac-Hole. Unlike the General Food storage container, once the inside of the depressed Push n' Vac Center Part makes contact with the beverage stored inside, you can continue to push downwards, which will force the beverage upwards along the sides of the container. As the storage container is tilted upwards on the Vac-Hole side, once the beverage reaches the Vac-Hole you will know that all of the air inside the container has been expelled. You can now push down the Shut n' Vac Slide to secure a complete vacuum, whilst also creating an internal platform to stack another Vac n' Stack storage container in order to save valuable space [FIG. 4.4.2]

Stack: With the vacuum now in place, the Push n' Vac Center-Part of the cover now acts as a platform on which you can stack another Vac n' Stack container to increase your storage efficiency. Simply place another Vac n' Stack storage container into the space that has been created from the Push n' Vac Center-Part being forced down. Due to its design the base of the other container should easily pass into this newly created space and rest securely on the platform that has been created for it by the depressed Push n' Vac Center Part. This action of securely stacking containers on top of each other can be repeated many times, saving huge amounts of storage space in the refrigerator [FIG. 4.4.3].

[4.1.4.5] Outline of the Product's Primary Solutions (with Reference to the Problem vs. Solution Drawings)

This subsection will provide a brief overview of the advantages of the Vac n' Stack Beverage storage container based on [FIG. 4.5]. These are accurately scaled drawings to help illustrate some of the key benefits (primarily with regards to space-saving):

1. Space-Saving: As the scaled drawings illustrate [FIG. 4.5.1] and [FIG. 4.5.2], a lot of space can be saved by using the Vac n' Stack storage containers. The drawing representing the problem shows a lot of wasted space with conventional storage containers. The solution shows minimal wasted space through the Vac n' Stack method.
2. Beverage-Longevity: Beverages stored in a vacuum stay fresher for much longer. Beverages stored in standard containers go flat (or sour in the case of milk) very quickly and take up a lot of space. The Vac n' Stack method keeps beverages fresher for longer in a fraction of the storage space. It's also easy to access the beverage by just releasing the vacuum. You can easily reseal it again when you're finished and quickly depress it the container back into a vacuum. The benefits of not having to be paranoid about the safety of beverages such as milk just days after buying them are priceless. Furthermore due to the airtight function you don't have to worry about any insect infestations.

[4.1.4.6] Variations of the Design

This subsection deals with possible variations of the design. One such design variation [FIG. 4.6] is to have a small piece of plastic sticking out from opposite sides of the Outer Perimeter of the cover, which can lock into another container (which would have corresponding grooves on its sides) that is stacked into it to ensure an even more secure fit.

Also instead of a Shut n' Vac Slide, a Slide n' Vac Switch could be used. This would ensure a 100% vacuum (compared to a very high level of vacuum for the Shut n' Vac Slide), however you may have to remove the Cover every time you wish to have a drink.

It might be considered to make the shape of the Beverage storage container circular as this may prove to be more fashionable for people to bring outside. However it is estimated that a curved container may waste as much as 27% more storage space (in a refrigerator setting) than the original proposed design.

It may be considered that the Main Container may be tinted with a dark color. This will further extend the longevity of the stored product, as it will greatly reduce sunlight exposure. However many consumers do like to see what is stored inside their containers. The first of two alternatives could be to market both a clear and dark-tinted product with their advantages and let the consumer make the decision. The second alternative could be to market a dark-tinted product, which has a clear design, incorporated into it (perhaps the product's brand name) so the consumer can still see inside with minimal sunlight exposure to the food.

[4.1.5] Canned and Jarred Food Storage (Reusable Cover)

The reusable cover is not a container with a fitted cover like the previous products. Instead it is a depressible cover that uses the same functional principal as the container i.e. its center can be depressed to form a vacuum with the depressed center acting as a platform to stack other products.

Whilst all the Vac n' Stack products can come in a variety of different sizes, it should be noted that for the Canned and Jarred Food storage cover market the number of different sizes may be able to be conveniently restricted without losing a share of the market. This is because the vast majority of jars and cans have a similar sized perimeter. This very large percentage of the market can be taken care of by a standard "One Size Fits '(almost)' All" product. A few additional variations could be created for smaller and larger jars and tins (which only make up a small percentage of the market).

The following subsections will deal with the references' specifications, detailed descriptions and best mode(s) of implementation along with other features relating to the Vac n' Stack covers for Canned and Jarred Food storage:

[4.1.5.1] References (Cross-Referenced Numerals from Drawings Contained in the FIG. 1 section).

The following numeral references are for those contained in [FIG. 5.1] (i.e. the Elevation, the End-view and the Plan) and [FIG. 5.2] (i.e. the Perspective). Numeral references for the Components and Process drawings will each be outlined in their respective subsection (i.e. [4.1.5.3] for Components and [4.1.5.4] for Process):

1. Underlying Stretchable Perimeter
2. Outer Stretchable Perimeter
3. Slide n' Vac Switch
4. Vac-Hole (or Valve)
5. Gasket
6. Stretchable Band
7. Push n' Vac Center Part (depressible part)
8. Tin or Jar (for demonstration purposes)

[4.1.5.2] General Description of the Product Design (with Reference to the Views and the Perspective Drawings)

The Vac n' Stack Cover design shown for Canned and Jarred Foods in [FIG. 5.1] is for a circular shaped product with the following basic observations:

The Elevation [FIG. 5.1.1] shows a two dimensional rectangular cover with an underlying rectangular perimeter below (to be attached to a rectangular can/jar)

The End-View [FIG. 5.1.2] shows a two dimensional rectangular cover with an underlying rectangular perimeter below (to be attached to a rectangular can/jar).

The Plan [FIG. 5.1.3] shows a circular cover with additional shapes encased within.

The Perspective [FIG. 5.2] shows a three-point perspective of the circular cover.

These designs are very much provisional and do not represent the final design of the invented product. The aim of these designs is to outline the basic details and functions of the product in a simplistic manner. General lines on the drawings show what can normally be seen from the respective view(s), whereas (in some cases) broken lines show hidden details that one may not expect to see from the respective view(s).

As seen from the Elevation [FIG. 5.1.1] and the End-View [FIG. 5.1.2] the underlying base of this attachable cover is an Underlying Stretchable Perimeter. This will cling to the outside of the can or jar and secure an airtight seal. Also shown is the Outer Stretchable Perimeter. As we are only dealing with a cover rather than an entire storage container, the issue of stackability is affected. As the shapes of tins and jars are generally based on a cylindrical prism, with the bottom base being in equal size to the opening, it will not be possible to stack one jar into another similar sized jar. However one can still store a smaller can or jar (or something else) inside a larger can or jar. The additional space created is still functional and will undoubtedly save space whilst keeping food fresher for longer.

As seen from the Plan [FIG. 5.1.3] and the Perspective [FIG. 5.2], it is proposed that the Vac n' Stack Cover will have an Outer Stretchable Perimeter that will contain a small Slide n' Vac Switch on one side. The Outer Stretchable Perimeter will be connected to a Stretchable Band via an airtight seal, which in turn will be connected to the Center-Part via a similar airtight seal. Both seals may require a gasket to ensure the seal is 100% airtight.

The provisional Plan design [FIG. 5.1.3] and the provisional Perspective design [FIG. 5.2] shows a Stretchable Band (manufactured from a strong, stretchable and highly durable material e.g. Thermoplastic polyurethane or Nitrile butadiene rubber). This Stretchable band will connect the Outer Stretchable Perimeter to the Push n' Vac Center-Part via a high quality airtight seal that will run along the inside lining of the Stretchable Outer Perimeter and the outside lining of the depressible Push n' Vac Center-Part. As this Stretchable Band will be stretched to perform the Vac n' Stack's primary functions, it is essential that the Stretchable Band is made of a high quality, durable material. Furthermore the airtight seal that will connect the Stretchable Band to the Stretchable Outer Perimeter and the depressible Push n' Vac Center-Part should be applied using a high-quality technique. This is to ensure that the Vac n' Stack Cover continues to be functional for as long as possible.

The provisional Plan [FIG. 5.1.3] and the provisional Perspective design [FIG. 5.2] also shows a Slide n' Vac Switch (located on the left-hand side of the Stretchable Outer Perimeter). The Slide n' Vac Switch contains the Vac-Hole, which is used to expel air and then sealed to create a vacuum. Alternatively it is also used to release a vacuum by unsealing it and allowing air to be sucked back into the can or jar. At this stage for this particular product for the can and jar storage market it is suggested that the vacuum function be implemented by inserting the index and middle finger onto the Center Part and applying pressure downwards. This will result in the Stretchable Band stretching, the Push n' Vac Center-Part of the cover being lowered down into the can or jar and air being forced out of the Vac-Hole. Once the inside of the Push n' Vac Center-Part of the cover makes contact with the product stored inside the can or jar, the thumb can push the Slide n' Vac Switch forwards to seal the Vac-Hole and secure a vacuum. However if the product inside the cane or jar is in a liquid or semi-liquid form, one can tilt the Vac-Hole side of the can or jar upwards and keep pushing downwards to force the product up until it reaches the Vac-Hole to ensure a 100% vacuum seal. This entire process will be discussed in more detail in the Process subsection [4.1.5.4].

[4.1.5.3] Components of the Product (with Reference to the Components Drawings)

This subsection will briefly detail each individual component that is currently needed to construct a Vac n' Stack Reusable Cover. Unlike the General Description subsection [4.1.5.2] and the Process sub-section [4.1.5.4], it will not detail the functionality of the components, but rather briefly outline their requirements. This list is provisional and subject to review:

1. Underlying Stretchable Perimeter: Made from a stretchable material that will cling to the can or jar to form an airtight bond. Must be sealed securely to the Outer Stretchable Perimeter.
2. Outer Stretchable Perimeter: This should have a small level of stretchability, however not to the same level as the Underlying Stretchable Perimeter and the Stretchable Band. It should also have a comfortable grip-like texture so should be made from a material like silicone.
3. Slide n' Vac Switch and Vac-Hole: This Switch and Vac-Hole should be permanently sealed into the Outer Stretchable Perimeter and possibly made from a similar material as the Center-Part.
4. Gasket: may be required at certain points to secure an airtight seal (e.g. between the Outer Stretchable Perimeter and the Stretchable Band).
5. Stretchable Band: Made from a high quality flexible material, it is connected via an airtight seal to the Outer Stretchable Perimeter and the Push n' Vac Center-Part. Its stretchability allows the Push n' Vac Center-Part to be pushed downwards in order to create a vacuum, thus helping to turn the Push n' Vac Center-Part into a platform whereby another slightly smaller can or jar can be placed, reducing the amount of storage space needed.
6. Push n' Vac Center-Part: This inner-part of the cover for the Stack n' Vac Cover brand will not have any particular features. It may be suggested to put in two circular grooves for the index and middle finger when applying pressure downwards. It is suggested that this part of the product may be made from the same material as the Slide n' Vac Switch.

[4.1.5.4] Process of Using the Product (with Reference to the Process Drawings)

As this product provides the hugely convenient mechanism of easily resealing opened cans and jars back into a vacuum environment, there is obviously no packing feature in this Process. Hence it's as easy as Seal, Vac and Stack [FIG. 5.4]:

Seal: As outlined in the Process drawings for Seal (1) and Seal (2), [FIG. 5.4.1] and [FIG. 5.4.2], there are two suggestions for the Seal stage, which covers the actual application of the cover onto the can or jar. The first suggestion, Seal (1), [FIG. 5.4.1] is that the cover is turned upside down and placed on top of the can or jar with the Underlying Stretchable Perimeter facing upwards. The four digits of both hands should be put inside the cover and grasp the perimeter of the can or jar through the Outer Stretchable Perimeter of the cover. Both hands should stretch the cover outwards whilst pushing it down. This will result in the cover turning inside out and completely covering the opening of the can or jar, with the Underlying Stretchable Perimeter securing the seal downwards. This suggestion requires the cover to have the flexibility to be turned inside out and for the inside to be identical to the outside and vice-versa. The second suggestion, Seal (2), [FIG. 5.4.2] is that someone holds the cover from beneath (holding onto the Underlying Stretchable Perimeter and the Outer Stretchable Perimeter) over the can or jar and simply stretches it outwards whilst bringing it downwards. Once the Center-Part hits the perimeter of the can or jar, one can slowly let go and let the cover retract forming an airtight bond.

Vac: Having secured an airtight seal around the can or jar, one can now easily vacuum seal the product as illustrated in [FIG. 5.4.3]. Simply tilt the storage container slightly so that the side with the Vac-Hole is raised (this technique will help ensure a 100% vacuum seal). Making sure that the Vac-Hole is open, one should use their index and middle finger to apply a gentle pressure downwards on the depressible Push n' Vac Center-Part. The Stretchable Band should begin to stretch, whilst the Push n' Vac Center-Part is gently forced downwards or depressed. As this is happening air is being forced out of the Vac-Hole. If the can or jar contains liquid food, you should continue applying pressure downwards (even after the inside of the Push n' Vac Center-Part makes contact with the food stored inside) as this will force the liquid food upwards along the sides of the can or jar. As the cover (and can or jar) is tilted upwards on the Vac-Hole side, once the liquid food reaches the Vac-Hole you will know that all of the air inside the container has been expelled. You can now slide the Slide n' Vac Switch forward to secure a complete 100% vacuum. (Note: Vac-Hole could be possibly replaced by a valve).

Stack: With the vacuum now in place, the Push n' Vac Center-Part of the cover now acts as a platform on which you can stack another slightly smaller can or jar to increase your storage efficiency. Simply place another can or jar into the space that has been created from the Push n' Vac Center-Part being forced down [FIG. 5.4.4].

[4.1.5.5] An Outline of the Solutions that the Product Provides (with Reference to the Problem vs. Solution Drawings)

This subsection will provide a brief overview of the advantages of the Vac n' Stack Covers based on [FIG. 5.5]. These are accurately scaled drawings to help illustrate some of the key benefits (primarily with regards to space-saving):

1. Space-Saving: As the scaled drawings illustrate, a lot of space can be saved by using the Vac n' Stack Covers. The drawing representing the problem shows a lot of wasted space with the conventional storage of cans and jars. The solution shows minimal wasted space through the Vac n' Stack Cover method.
2. Food-Longevity: Food stored in a vacuum stays fresher for much longer and unlike other more inconvenient methods of vacuum packing, you have instant access to your vacuum packed food at any time. Just release the vacuum and reseal it again when you're finished with no need to get the canning machine out every time you only eat a half can of beans.

[4.1.5.6] Variations of the Design

This subsection deals with possible variations of the design. One such design variation [FIG. 5.6] is to adapt the Can or Jar Covers' design by increasing the size to make it also suitable for dishware such as plates and dishes. This idea could remain basically the same for the dish (as it has a lot of internal space), however it would need to be further adapted for a flat (or nearly flat) plate. This could involve creating a small additional container on the cover to create additional space for a vacuum. The Underlying Stretchable Perimeter could be sealed underneath the plate. Apart from preserving food, it would also keep meals hot, as heat cannot travel in a vacuum.

The invention claimed is:

1. A fitted depressible cover with a storage container having a generally planar base, the cover comprising primarily of a rigid center part, an intermediate part comprising a stretchable band, and a rigid outer perimeter part, whereby the rigid outer perimeter part of the cover forms an airtight seal with the rim of the container after the cover has been fitted onto the container and the rigid center part of the cover is configured to be depressed into the container which will result in the stretchable band being stretched and air being expelled from the container through a hole in the cover that can be sealed shut by a slidable switch, in a first position, thereby creating a vacuum that will keep the center part of the cover lowered below the rim of the container allowing the center part to serve as a depressed leveled platform for accommodating a planar base of another similar storage container, and keeping the similar storage container in a leveled state, and when the switch is pushed in an opposite direction to a second position, the vacuum is released, returning the cover to a non-depressed state.

* * * * *